United States Patent
Zhao

(10) Patent No.: US 11,784,763 B2
(45) Date of Patent: Oct. 10, 2023

(54) METHOD, APPARATUS, AND SYSTEM FOR TRANSMITTING FEEDBACK INFORMATION BETWEEN INTERNET-OF-VEHICLES DEVICES

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 181 days.

(21) Appl. No.: 17/267,480

(22) PCT Filed: Aug. 10, 2018

(86) PCT No.: PCT/CN2018/100057
§ 371 (c)(1),
(2) Date: Feb. 9, 2021

(87) PCT Pub. No.: WO2020/029278
PCT Pub. Date: Feb. 13, 2020

(65) Prior Publication Data
US 2021/0314109 A1  Oct. 7, 2021

(51) Int. Cl.
*H04L 1/1867* (2023.01)
*H04W 4/46* (2018.01)
(Continued)

(52) U.S. Cl.
CPC .......... *H04L 1/1896* (2013.01); *H04L 1/1819* (2013.01); *H04W 4/46* (2018.02);
(Continued)

(58) Field of Classification Search
CPC ...... H04L 1/1896; H04L 1/1819; H04W 4/46; H04W 72/02; H04W 72/0446;
(Continued)

(56) References Cited

U.S. PATENT DOCUMENTS

| 11,330,561 | B2 * | 5/2022 | Zhao | H04L 5/0055 |
| 2014/0044206 | A1 * | 2/2014 | Nammi | H04B 7/0417 |
| | | | | 375/267 |

(Continued)

FOREIGN PATENT DOCUMENTS

| CN | 106797287 A | 5/2017 |
| CN | 107846707 A | 3/2018 |

(Continued)

OTHER PUBLICATIONS

Office Action of the Indian application No. 202147008959, dated Jan. 21, 2022.

(Continued)

*Primary Examiner* — Benjamin H Elliott, IV
*Assistant Examiner* — Nevena Zecevic Sandhu
(74) *Attorney, Agent, or Firm* — SYNCODA LLC; Feng Ma

(57) ABSTRACT

A method for transmitting feedback information between Internet-of-Vehicles (IOV) devices includes: a second IOV device receives at least one of first user data and scheduling control information of the first user data from a first IOV device; a second resource location of the first user data is determined based on a first resource location of the first user data, the first resource location indicating at least one of a time-frequency location of corresponding user data and a time-frequency location of scheduling control information of the corresponding user data; and Hybrid Automatic Repeat Request (HARQ) feedback information of the first user data is sent to the first IOV device based on the second resource location of the first user data.

16 Claims, 8 Drawing Sheets

```
┌─────────────────┐                            ┌─────────────────┐
│ First IOV device│                            │Second IOV device│
└─────────────────┘                            └─────────────────┘
         S501, At least one of first user data device and scheduling
              control information of the first user data is sent ──▶

┌──────────────────────────┐   ┌──────────────────────────┐
│ S503, A second resource  │   │ S502, A second resource  │
│ location of the first    │   │ location of the first    │
│ user data is determined  │   │ user data is determined  │
│ based on the first       │   │ based on the first       │
│ resource location of     │   │ resource location of     │
│ the first user data      │   │ the first user data      │
└──────────────────────────┘   └──────────────────────────┘
         S504, HARQ feedback information of the first user
         data is sent based on the second resource location
    ◀─────────────── of the first user data ───────────────
```

(51) Int. Cl.
| | |
|---|---|
| *H04L 1/1812* | (2023.01) |
| *H04W 72/02* | (2009.01) |
| *H04W 72/0446* | (2023.01) |
| *H04W 72/0453* | (2023.01) |
| *H04W 72/1263* | (2023.01) |
| *H04W 72/20* | (2023.01) |
| *H04W 92/18* | (2009.01) |

(52) U.S. Cl.
CPC ....... *H04W 72/02* (2013.01); *H04W 72/0446* (2013.01); *H04W 72/0453* (2013.01); *H04W 72/1263* (2013.01); *H04W 72/20* (2023.01); *H04W 92/18* (2013.01)

(58) Field of Classification Search
CPC ......... H04W 72/0453; H04W 72/1263; H04W 72/1278; H04W 92/18
See application file for complete search history.

(56) References Cited

U.S. PATENT DOCUMENTS

| | | | |
|---|---|---|---|
| 2019/0349173 A1 | 11/2019 | Kim et al. | |
| 2021/0259004 A1* | 8/2021 | Takeda | H04W 72/1289 |
| 2021/0282118 A1* | 9/2021 | Zuo | H04L 1/1893 |

FOREIGN PATENT DOCUMENTS

| | | |
|---|---|---|
| CN | 108322414 A | 7/2018 |
| CN | 108631968 A | 10/2018 |
| WO | 2017191917 A1 | 11/2017 |
| WO | 2018004296 A2 | 1/2018 |
| WO | 2018124776 A1 | 7/2018 |
| WO | 2018133720 A1 | 7/2018 |

OTHER PUBLICATIONS

Supplementary European Search Report in the European application No. 18929572.8, dated Jul. 16, 2021.

International Search Report in the international application No. PCT/CN2018/100057, dated Feb. 12, 2019.

English translation of the Written Opinion of the International Search Authority in the international application No. PCT/CN2018/100057, dated Feb. 12, 2019.

3GPP, Phase II of [NR_V2X] Study Item email discussion, 3GPP discussion summary, RP-181063, Jun. 4, 2018 (Jun. 4, 2018), entire document.

InterDigital Communications, A common framework for control channel design for NR, 3GPP TSG RAN WG1 Meeting #87, R1-1612645, Nov. 4, 2016 (Nov. 4, 2016), entire document.

First Office Action of the Chinese application No. 201880001009.0, dated Sep. 3, 2020.

* cited by examiner

METHOD, APPARATUS, AND SYSTEM FOR TRANSMITTING FEEDBACK INFORMATION BETWEEN INTERNET-OF-VEHICLES DEVICES

CROSS-REFERENCE TO RELATED APPLICATION

This application is a U.S. national stage of International Application No. PCT/CN2018/100057 filed on Aug. 10, 2018, the disclosure of which is hereby incorporated by reference in its entirety.

TECHNICAL FIELD

The present disclosure relates to the technical field of wireless communications, and more specifically to a method, apparatus and system for transmitting feedback information between Internet-of-Vehicles (IOV) devices.

BACKGROUND

IOV is a new development direction of vehicle technology combined with navigation and positioning, wireless communications and remote sensing and other technologies.

In related art, information transmission between devices may be performed by broadcasting information between IOV devices. For example, an IOV device at a sending end may send scheduling assignment control signaling while sending user data. The control signaling includes scheduling information for receiving the corresponding user data, which includes time-frequency shift resource allocation, Modulation and Coding Scheme (MCS), resource occupation information, priority information and so on. An IOV device at a receiving end may receive all the data that can be received at a physical layer, and filter the data at a Media Access Control (MAC) layer.

SUMMARY

The present disclosure provides a method for transmitting feedback information between IOV devices. The technical solutions are as follows.

According to a first aspect of the embodiments of the present disclosure, a method for transmitting feedback information between IOV devices is provided, which may include the following operations.

A first IOV device sends at least one of first user data and scheduling control information of the first user data to a second IOV device.

The second IOV device receives the first user data.

The first IOV device and the second IOV device respectively determine a second resource location of the first user data based on a first resource location of the first user data, the first resource location indicating at least one of a time-frequency location of corresponding user data and a time-frequency location of scheduling control information of the corresponding user data.

The second IOV device sends Hybrid Automatic Repeat Request (HARQ) feedback information of the first user data to the first IOV device based on the second resource location of the first user data.

The first IOV device receives the HARQ feedback information based on the second resource location of the first user data.

According to a second aspect of the embodiments of the present disclosure, a method for transmitting feedback information between IOV devices is provided, which is applicable to the second IOV device, and may include the following operations.

At least one of first user data and scheduling control information of the first user data is received from a first IOV device.

A second resource location of the first user data is determined based on a first resource location of the first user data, the first resource location indicating at least one of a time-frequency location of corresponding user data and a time-frequency location of scheduling control information of the corresponding user data.

The HARQ feedback information of the first user data is sent to the first IOV device based on the second resource location of the first user data.

Optionally, the operation that the second resource location of the first user data is determined based on the first resource location of the first user data may include that:

the second resource location of the first user data is determined from a feedback resource pool based on the first resource location of the first user data.

A time-frequency resource in the feedback resource pool is configured to send the HARQ feedback information.

Optionally, the feedback resource pool may include a plurality of time-frequency units. The operation that the HARQ feedback information of the first user data is sent to the first IOV device based on the second resource location of the first user data may include that:

a time-frequency unit corresponding to the second resource location of the first user data is determined according to a preset mapping rule, the preset mapping rule including mapping relationships between time-frequency resource locations in a data resource pool and the plurality of time-frequency units in the feedback resource pool, or, the preset mapping rule including mapping relationships between time-frequency resource locations in a scheduling control information resource pool and the plurality of time-frequency units in the feedback resource pool, the data resource pool being a resource pool configured to transmit user data, and the scheduling control information resource pool being a resource pool configured to transmit the scheduling control information of the user data; and the HARQ feedback information of the first user data is sent to the first IOV device on the time-frequency unit corresponding to the second resource location of the first user data.

Optionally, the operation that the HARQ feedback information of the first user data is sent to the first IOV device based on the second resource location of the first user data may include that:

when the first user data is user data that needs to be transmitted repeatedly, the HARQ feedback information of the first user data is sent based on the second resource location of the first user data in last repeated transmission;

or, when the first user data is user data that needs to be transmitted repeatedly, the HARQ feedback information of the first user data in present repeated transmission is sent based on the second resource location of the first user data in each repeated transmission.

Optionally, the first user data may be one of at least two sets of user data received by the second IOV device, and respective second resource locations of the at least two sets of user data have an overlap in time domain.

The operation that the HARQ feedback information of the first user data is sent to the first IOV device based on the second resource location of the first user data may include that:
- a target resource location is determined, the target resource location being one of the second resource locations of the at least two sets of user data;
- combined information of respective HARQ feedback information of the at least two sets of user data is obtained, the combined information including part or all of the HARQ feedback information of the at least two sets of user data; and
- the combined information is sent on a time-frequency resource corresponding to the target resource location.

Optionally, the operation that the target resource location is determined may include that:
- a resource location with a highest or lowest frequency is determined from the second resource locations of the at least two sets of user data as the target resource location;
- or, a second resource location of user data with an initial time-frequency location having an earliest or latest time domain in the at least two sets of user data is determined as the target resource location;
- or, a second resource location of user data with an initial time-frequency location having a highest or lowest frequency domain in the at least two sets of user data is determined as the target resource location;
- or, a second resource location of user data with highest service priority in the at least two sets of user data is determined as the target resource location;
- or, a second resource location of user data with a highest or lowest transmission physical layer parameter in the at least two sets of user data is determined as the target resource location.

Optionally, the operation that the combined information of the respective HARQ feedback information of the at least two sets of user data is obtained may include that:
- HARQ feedback information of user data corresponding to the target resource location is obtained as the combined information;
- or, the respective HARQ feedback information of the at least two sets of user data is combined into the combined information;
- or, the respective HARQ feedback information of the at least two sets of user data and Non-Acknowledge (NACK) corresponding to a same feedback resource location in time domain as the respective HARQ feedback information are combined into the combined information in a frequency domain order, the same feedback resource location in the time domain being other resource locations, which have an overlap with the respective second resource locations of the at least two sets of user data in the time domain, in the feedback resource pool.

According to a third aspect of the embodiments of the present disclosure, a method for transmitting feedback information between IOV devices is provided, which is applicable to the first IOV device, and may include the following operations.

At least one of first user data device and scheduling control information of the first user data is sent to the second IOV device.

The second resource location of the first user data is determined based on a first resource location of the first user data, the first resource location indicating at least one of a time-frequency location of corresponding user data and a time-frequency location of scheduling control information of the corresponding user data.

The HARQ feedback information of the first user data is received based on the second resource location of the first user data.

Optionally, the operation that the second resource location of the first user data is determined based on the first resource location of the first user data may include that:
- the second resource location of the first user data is determined from a feedback resource pool based on the first resource location of the first user data.

A time-frequency resource in the feedback resource pool is configured to send the HARQ feedback information.

Optionally, the operation that the HARQ feedback information of the first user data is received based on the second resource location of the first user data may include that:
- the HARQ feedback information of the first user data is received on a time-frequency resource corresponding to the second resource location of the first user data;
- or,
- the HARQ feedback information of the first user data is received on a time-frequency resource corresponding to the second resource location of the first user data and other resource locations which have an overlap with the second resource location of the first user data in time domain and are higher than the second resource location of the first user data in frequency domain in the feedback resource pool;
- or,
- the HARQ feedback information of the first user data is received on a time-frequency resource corresponding to the second resource location of the first user data and other resource locations which have an overlap with the second resource location of the first user data in time domain and are lower than the second resource location of the first user data in frequency domain in the feedback resource pool.

According to a fourth aspect of the embodiments of the present disclosure, an apparatus for transmitting feedback information between IOV devices is provided, which is applicable to the second IOV device and may include a data receiving module, a resource location determining module and a feedback information sending module.

The data receiving module is configured to receive at least one of first user data and scheduling control information of the first user data from a first IOV device.

The resource location determining module is configured to determine a second resource location of the first user data based on the first resource location of the first user data, the first resource location indicating at least one of a time-frequency location of corresponding user data and a time-frequency location of scheduling control information of the corresponding user data.

The HARQ feedback information sending module is configured to send HARQ feedback information of the first user data to the first IOV device based on the second resource location of the first user data.

Optionally, the resource location determining module is specifically configured to determine a second resource location of the first user data from a feedback resource pool based on the first resource location of the first user data.

A time-frequency resource in the feedback resource pool is configured to send the HARQ feedback information.

Optionally, the feedback resource pool may include a plurality of time-frequency units. The HARQ feedback information sending module may specifically include: a time-frequency unit determining submodule and a feedback information sending submodule.

The time-frequency unit determining submodule is configured to determine a time-frequency unit corresponding to the second resource location of the first user data according to a preset mapping rule, the preset mapping rule including mapping relationships between time-frequency resource locations in a data resource pool and the plurality of time-frequency units in the feedback resource pool, or the preset mapping rule including mapping relationships between time-frequency resource locations in a scheduling control information resource pool and the plurality of time-frequency units in the feedback resource pool, the data resource pool being a resource pool configured to transmit user data, and the scheduling control information resource pool being a resource pool configured to transmit scheduling control information of the user data.

The HARQ feedback information sending submodule is configured to send HARQ feedback information of the first user data to the first IOV device on the time-frequency unit corresponding to the second resource location of the first user data.

Optionally, the HARQ feedback information sending module is specifically configured to:
when the first user data is user data that needs to be transmitted repeatedly, send HARQ feedback information of the first user data based on the second resource location of the first user data in last repeated transmission;
or,
when the first user data is user data that needs to be transmitted repeatedly, send the HARQ feedback information of the first user data in present repeated transmission based on the second resource location of the first user data in each repeated transmission.

Optionally, the first user data is one of at least two sets of user data received by the second IOV device, and respective second resource locations of the at least two sets of user data have an overlap in the time domain. The HARQ feedback information sending module may include: a location determining submodule, a combined information obtaining submodule and a combined information sending submodule.

The location determining submodule is configured to determine a target resource location, the target resource location being one of the second resource locations of the at least two sets of user data.

The combined information obtaining submodule is configured to obtain combined information of respective HARQ feedback information of the at least two sets of user data, the combined information including part or all of the HARQ feedback information of the at least two sets of user data.

The combined information sending submodule is configured to send the combined information on a time-frequency resource corresponding to the target resource location.

Optionally, the location determining submodule is specifically configured to:
determine a resource location with a highest or lowest frequency from the second resource locations of the at least two sets of user data as the target resource location;
or, determine a second resource location of user data with an initial time-frequency location having an earliest or latest time domain in the at least two sets of user data as the target resource location;
or, determine a second resource location of user data with an initial time-frequency location having a highest or lowest frequency domain in the at least two sets of user data as the target resource location;
or, determine a second resource location of user data with highest service priority in the at least two sets of user data as the target resource location;
or, determine a second resource location of user data with a highest or lowest transmission physical layer parameter in the at least two sets of user data as the target resource location.

Optionally, the combined information obtaining submodule is specifically configured to:
obtain HARQ feedback information of user data corresponding to the target resource location as the combined information;
or, combine the respective HARQ feedback information of the at least two sets of user data into the combined information;
or, combine the respective HARQ feedback information of the at least two sets of user data and an NACK corresponding to a same feedback resource location in time domain as the respective HARQ feedback information into the combined information in a frequency domain order, wherein the same feedback resource location in the time domain is other resource locations, which have an overlap with the respective second resource locations of the at least two sets of user data in the time domain, in the feedback resource pool.

According to a fifth aspect of the embodiments of the present disclosure, an apparatus for transmitting feedback information between IOV devices is provided, which is applicable to the first IOV device, and may include a data sending module, a resource location determining module and a feedback information receiving module.

The data sending module is configured to send at least one of first user data device and scheduling control information of the first user data to a second IOV device.

The resource location determining module is configured to determine a second resource location of the first user data based on a first resource location of the first user data, the first resource location indicating at least one of a time-frequency location of corresponding user data and a time-frequency location of scheduling control information of the corresponding user data.

The HARQ feedback information receiving module is configured to receive HARQ feedback information of the first user data based on the second resource location of the first user data.

Optionally, the resource location determining module is specifically configured to determine a second resource location of the first user data from a feedback resource pool based on the first resource location of the first user data.

A time-frequency resource in the feedback resource pool is configured to send the HARQ feedback information.

Optionally, the HARQ feedback information receiving module is specifically configured to:
receive HARQ feedback information of the first user data on a time-frequency resource corresponding to the second resource location of the first user data;
or,
receive HARQ feedback information of the first user data on a time-frequency resource corresponding to the second resource location of the first user data and other resource locations which have an overlap with the second resource location of the first user data in time domain and are higher than the second resource location of the first user data in frequency domain in the feedback resource pool;

or, receive HARQ feedback information of the first user data on a time-frequency resource corresponding to the second resource location of the first user data and other resource locations which have an overlap with the second resource location of the first user data in time domain and are lower than the second resource location of the first user data in frequency domain in the feedback resource pool.

According to a sixth aspect of the embodiments of the present disclosure, an apparatus for transmitting feedback information between IOV devices is provided, which is applicable to the second IOV device and may include:

a processor; and a memory for storing an instruction executable by the processor.

The processor is configured to:

receive at least one of first user data and scheduling control information of the first user data from a first IOV device;

determine a second resource location of the first user data based on a first resource location of the first user data, the first resource location indicating at least one of a time-frequency location of corresponding user data and a time-frequency location of scheduling control information of the corresponding user data; and send HARQ feedback information of the first user data to the first IOV device based on the second resource location of the first user data.

According to a seventh aspect of the embodiments of the present disclosure, an apparatus for transmitting feedback information between IOV devices is provided, which is applicable to the first IOV device and may include:

a processor; and a memory for storing an instruction executable by the processor.

The processor is configured to:

send at least one of first user data and scheduling control information of the first user data to a second IOV device;

determine a second resource location of the first user data based on a first resource location of the first user data, the first resource location indicating at least one of a time-frequency location of corresponding user data and a time-frequency location of scheduling control information of the corresponding user data; and receive HARQ feedback information of the first user data based on the second resource location of the first user data.

According to an eighth aspect of the embodiments of the present disclosure, a computer-readable storage medium is provided, which may include an executable instruction. The processor in the second IOV device may call the executable instruction to implement the method for transmitting feedback information between the IOV devices in the second aspect or any optional solution of the second aspect.

According to a ninth aspect of the embodiments of the present disclosure, a computer-readable storage medium is provided, which may include an executable instruction. The processor in the first IOV device may call the executable instruction to implement the method for transmitting feedback information between the IOV devices in the third aspect or any optional solution of the third aspect.

The technical solutions provided in the embodiments of the present disclosure may have the following beneficial effects.

After a first IOV device sends at least one of first user data and scheduling control information of the first user data to a second IOV device, the second IOV device may determine a resource location for sending HARQ feedback information of the first user data based on a resource location related to the first user data, and send the HARQ feedback information of the first user data based on the determined resource location. The first IOV device may receive the HARQ feedback information from the second IOV device at the same resource location. That is, the resource location of the HARQ feedback information may be determined based on the resource location corresponding to the user data, without configuring a center node for scheduling feedback resources, so that support for HARQ feedback is realized in IOV communications.

It is to be understood that the above general descriptions and detailed descriptions below are only exemplary and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
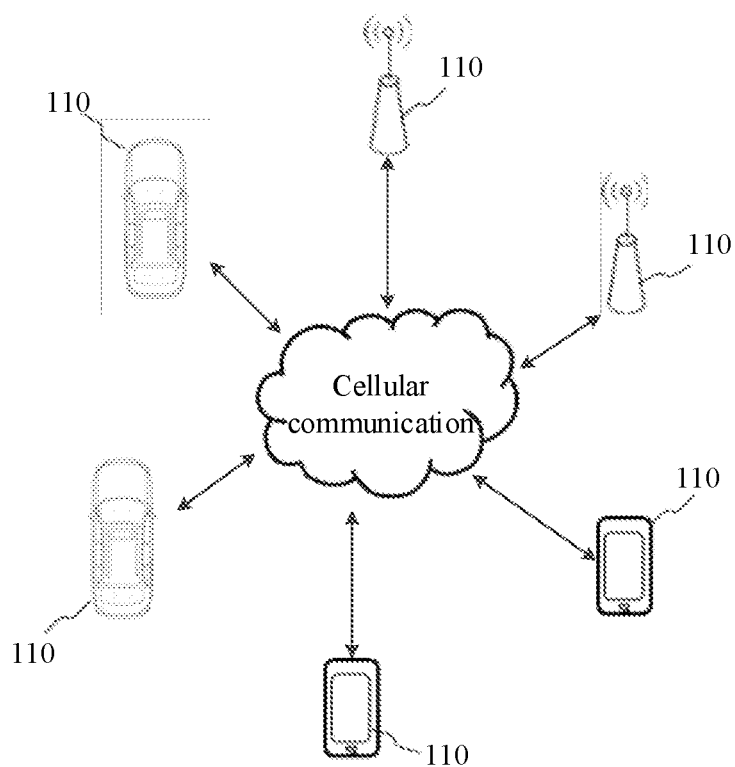
FIG. 1 is a schematic diagram of an implementation environment involved in a method for transmitting feedback information between IOV devices according to some exemplary embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

It is to be understood that "a plurality of" mentioned herein refers to two or more and "multiple" refers to two or more than two. "And/or" describes an association relationship of associated objects and represent that three relationships may exist. For example, A and/or B may represent three conditions, i.e., independent existence of A, coexistence of A and B and independent existence of B. Character "/" usually represents that previous and next associated objects form an "or" relationship.

The IOV communication is also called Vehicle to Everything (V2x) communication, which includes Vehicle to Vehicle (V2V) communication, Vehicle to Infrastructure (V2I) communication and Vehicle to Pedestrian (V2P) communication. Through the V2V, V2I and V2P communication, the IOV technology can effectively enhance traffic safety, improve traffic efficiency and enrich people's travel experience.

The use of the existing cellular communication technology to support the IOV communication can effectively utilize the existing base station deployment, reduce equipment overhead, and is also more conducive to providing services with a Quality of Service (QoS) guarantee, thus meeting the requirements of IOV services. Therefore, Rel-14/15 of the Long Term Evolution (LTE) technology provides a support from a cellular network to the V2x communication of the IOV, that is, a cellular based V2x (C-V2x) technology. In the C-V2x technology, communication between vehicle-mounted devices and other devices may be transferred through a base station and a core network, that is, a communication link between a terminal device and a base station in the original cellular network is used to perform communication (uplink/downlink communication). In another possible mode, the vehicle-mounted device may also directly communicate with other devices through a direct link between devices, for example, through a sidelink. Compared with uplink/downlink communication, sidelink communication has advantage in short time delay and low overhead, and is very suitable for direct communication between the vehicle-mounted device and other peripheral devices with close geographical location.

V2x sidelink communication in LTE can support some basic V2x applications on safety, for example, exchanging Basic Safety Messages (BSM) like Cooperative Awareness Message (CAM) or Decentralized Environmental Notification Message (DENM), performing voice broadcast communication, etc. Recently, with the development of autonomous driving and other technologies, new requirements have been put forward for performance of the V2x technology to support new V2x services. The use of the 5G New Radio (NR) technology to support new V2x communication services and scenarios has been planned by 3GPP as an important subject of Rel16. The 3GPP working group has established some new service requirements that the V2x communication needs to meet, including vehicles platooning, extended sensors, advanced driving, and remote driving. In general, NR V2x sidelink needs to provide higher communication rate, shorter communication delay, and more reliable communication quality.

In related art, multicast and unicast communication of a physical layer is not supported in the V2x of LTE, and all communications of the physical layer are sent based on broadcast. An IOV device may also send Scheduling Assignment (SA) control signaling through a Physical Sidelink Control Channel (PSCCH) while sending user data through a Physical Sidelink Share Channel (PSSCH). Since the transmission is broadcast communication, the SA control signaling usually does not contain the address of a sending end or the address of a receiving end. The physical layer of the IOV device at the receiving end may receive all V2x data that can be received, and the data may be further filtered by an MAC layer of the IOV device at the receiving end.

However, in the V2x of 5G NR, in order to meet the new service requirements, the physical layer of the IOV device is required to support the unicast and multicast communication; moreover, the unicast and multicast communication supported by the physical layer of the IOV device may effectively adjust a modulation and coding mode based on the channel quality, perform closed-loop power control or more precise allocation of time and frequency resources. Therefore, a broadcast transmission mode of the LTE V2x physical layer in the related art needs to be modified.

Each designed embodiment of the present disclosure shows a solution for realizing support for HARQ feedback during unicast communication between IOV devices.

FIG. 1 is a schematic diagram of an implementation environment involved in a method for transmitting feedback information between IOV devices according to some exemplary embodiments. As shown in FIG. 1, the implementation environment may include: a plurality of IOV devices 110.

The IOV device 110 may be wireless communication devices supporting the V2x technology. For example, the IOV device 110 may support cellular mobile communication (the 4th generation mobile communication (4G)) technology or the 5G technology. Or, the IOV device 110 may also support the next generation mobile communication technology of the 5G technology.

For example, the IOV device 110 may be a vehicle-mounted communication device, and for example, it may be a driving computer with a wireless communication function or a wireless communication device connected to a driving computer.

Or, the IOV device 110 may also be a roadside device, for example, it may be a street lamp, a signal lamp or other roadside devices with a wireless communication function.

Or, the IOV device 110 may also be a user terminal device, for example, a mobile phone (or called a "cell" phone) and a computer with a mobile terminal such as a portable, pocket-sized, handheld, computer-embedded or vehicle-mounted mobile device, For example, the IOV device 110 may be a Station (STA), a subscriber unit, a subscriber STA, a mobile STA, a mobile, a remote STA, an access point, a remote terminal, an access terminal, a user terminal, a user agent, a user device or User Equipment (UE). For a specific example, the IOV device 110 may be a smart phone, a tablet PC, an e-book reader and other mobile terminals, or may be smart glasses, a smart watch, a smart bracelet and other smart wearable devices.

Figure 2:
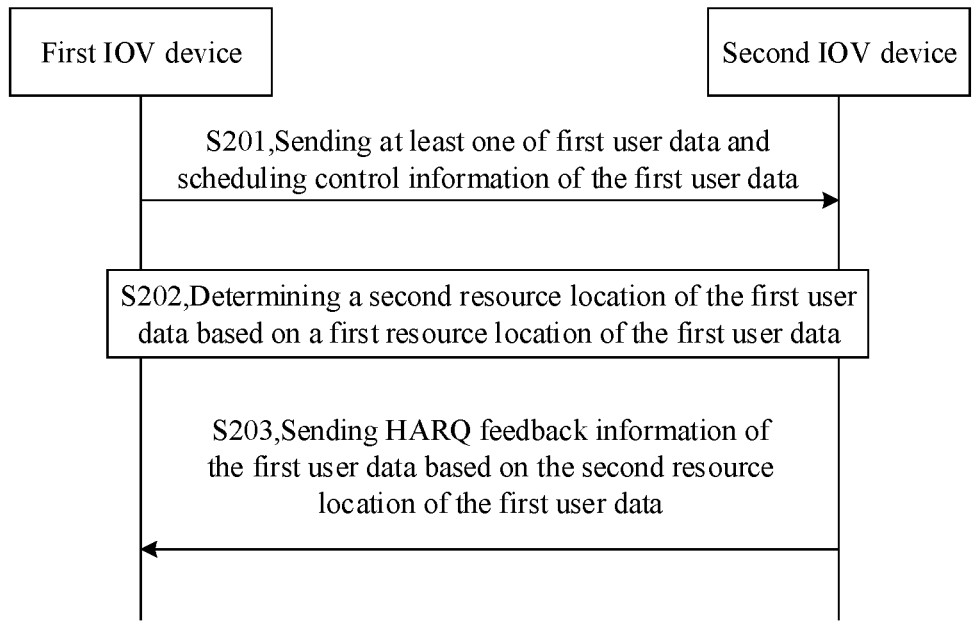
FIG. 2 is a flowchart of a method for transmitting feedback information between IOV devices according to an exemplary embodiment.

FIG. 2 is a flowchart of a method for transmitting feedback between IOV information devices according to an exemplary embodiment. As shown in FIG. 2, the method for transmitting feedback information between IOV devices is applicable to the implementation environment shown in FIG. 1. The method may include the following operations.

At operation S201, a first IOV device sends at least one of first user data and scheduling control information of the first user data to a second IOV device, and the second IOV device receives at least one of first user data device and scheduling control information of the first user data.

At operation S202, the first IOV device and the second IOV device respectively determine a second resource location of the first user data based on a first resource location of the first user data, the first resource location indicating at least one of a time-frequency location of corresponding user data and a time-frequency location of scheduling control information of the corresponding user data.

At operation S203, the second IOV device sends HARQ feedback information of the first user data to the first IOV device based on the second resource location of the first user data, and the first IOV device receives the HARQ feedback information based on the second resource location of the first user data.

In the uplink and downlink communication of LTE and NR, a physical layer HARQ mechanism is used for the uplink and downlink unicast communication to ensure the integrity and reliability of data transmission. For the uplink and downlink unicast communication of NR/LTE, there is a base station as the center node, and all the uplink and downlink data transmission and feedback information transmission are scheduled by the center node. The base station side ensures that there will be no collision of time-frequency resources between transmissions of HARQ feedback information and no collision of time-frequency resources between transmission of HARQ feedback information and transmission of data transmission.

However, in V2x, since there is no center node, the time-frequency resources used for data transmission are usually chosen by a sending end. Each IOV device only knows its own local information and cannot control the use of other users' resources. Therefore, to support HARQ feedback in V2x, how feedback information is associated with the corresponding data and how to schedule time-frequency resources of the feedback information need to be reconsidered.

In the solutions shown in the embodiments of the present disclosure, there is no need to configure a dedicated center node to schedule resources for HARQ feedback information between the first IOV device and the second IOV device. After receiving the user data, the second IOV device at the receiving side may determine the resource location of the HARQ feedback information of the user data based on the resource location of the user data and/or the scheduling control information corresponding to the user data, and send the HARQ feedback information based on the determined resource location.

Correspondingly, the first IOV device at the sending side may also determine the resource location of the HARQ feedback information of the user data based on the resource location of the user data and/or the scheduling control information corresponding to the user data, and receive the HARQ feedback information based on the determined resource location.

In the embodiments of the present disclosure, the resource location may be a time-frequency resource location for data or information transmission.

To sum up, after the first IOV device sends first user data to the second IOV device, the second IOV device may determine a resource location for sending HARQ feedback information of the first user data based on a resource location related to the first user data, and send the HARQ feedback information of the first user data based on the determined resource location. The first IOV device may receive the HARQ feedback information from the second IOV device at the same resource location. That is, the resource location of the HARQ feedback information may be determined based on the resource location corresponding to the user data, without configuring a center node for scheduling feedback resources, so that support for HARQ feedback in IOV communications is realized.

Figure 3:
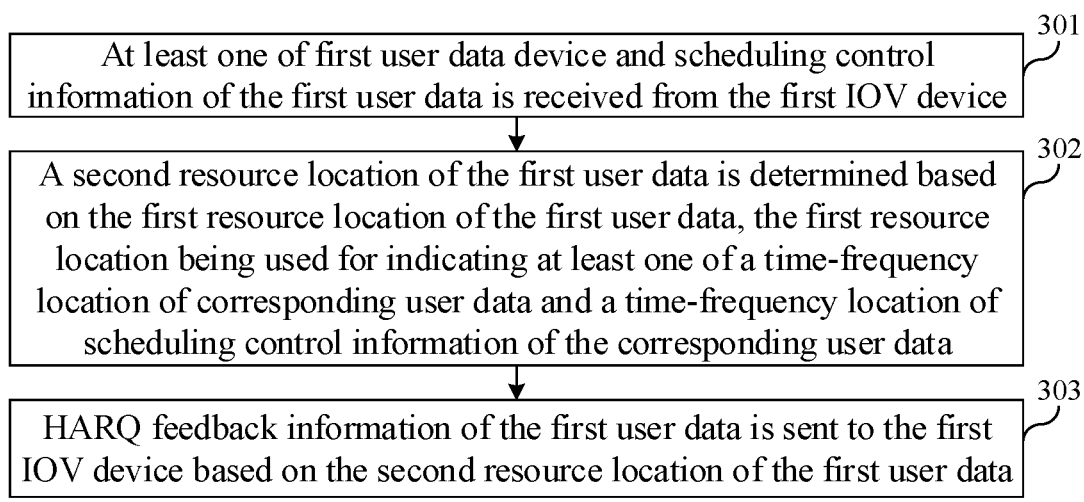
FIG. 3 is a flowchart of a method for transmitting feedback information between IOV devices according to an exemplary embodiment.

FIG. 3 is a flowchart of a method for transmitting feedback information between IOV devices according to an exemplary embodiment. The method may be performed by the second IOV device in the embodiment shown in FIG. 2. The method may include the following operations.

At operation S301, the second IOV device receives at least one of first user data device and scheduling control information of the first user data from the first IOV device.

At operation S302, the second IOV device determines a second resource location of the first user data based on the first resource location of the first user data, the first resource location indicating at least one of a time-frequency location of corresponding user data and a time-frequency location of scheduling control information of the corresponding user data.

At operation S303, the second IOV device sends HARQ feedback information of the first user data to the first IOV device based on the second resource location of the first user data.

Optionally, the operation that the second resource location of the first user data is determined based on the first resource location of the first user data may include that:

the second resource location of the first user data is determined from the feedback resource pool based on the first resource location of the first user data.

A time-frequency resource in the feedback resource pool may be configured to send the HARQ feedback information. Or, the HARQ feedback information may be sent through the time-frequency resource in the feedback resource pool. Or, the time-frequency resource in the feedback resource pool may be configured to send the HARQ feedback information, and the HARQ feedback information may be sent through the time-frequency resource in the feedback resource pool.

Optionally, the feedback resource pool may include a plurality of time-frequency units. The operation that the HARQ feedback information of the first user data is sent to the first IOV device based on the second resource location of the first user data may include that:

a time-frequency unit corresponding to the second resource location of the first user data is determined according to a preset mapping rule, the preset mapping rule including mapping relationships between time-frequency resource locations in a data resource pool and the plurality of time-frequency units in the feedback resource pool, or the preset mapping rule including mapping relationships between time-frequency resource locations in a scheduling control information resource pool and the plurality of time-frequency units in the feedback resource pool, the data resource pool being a resource pool configured to transmit user data, and the scheduling control information resource pool being a resource pool configured to transmit scheduling control information of the user data; and the HARQ feedback information of the first user data is sent to the first IOV device on the time-frequency unit corresponding to the second resource location of the first user data.

Optionally, the operation that the HARQ feedback information of the first user data is sent to the first IOV device based on the second resource location of the first user data may include that:

when the first user data is user data that needs to be transmitted repeatedly, the HARQ feedback information of the first user data is sent based on the second resource location of the first user data in last repeated transmission;

or, when the first user data is user data that needs to be transmitted repeatedly, the HARQ feedback information of the first user data in present repeated transmission is sent based on the second resource location of the first user data in each repeated transmission.

Optionally, the first user data is one of at least two sets of user data received by the second IOV device, and respective second resource locations of the at least two sets of user data have an overlap in time domain.

The operation that the HARQ feedback information of the first user data is sent to the first IOV device based on the second resource location of the first user data may include that:

a target resource location is determined, the target resource location being one of the second resource locations of the at least two sets of user data;

combined information of respective HARQ feedback information of the at least two sets of user data is obtained, the combined information including part or all of the HARQ feedback information of the at least two sets of user data; and the combined information is sent on a time-frequency resource corresponding to the target resource location.

Optionally, the operation that the target resource location is determined may include that:

a resource location with a highest or lowest frequency from the second resource locations of the at least two sets of user data is determined as the target resource location;

or, a second resource location of user data with an initial time-frequency location having an earliest or latest time domain in the at least two sets of user data is determined as the target resource location;

or, a second resource location of user data with an initial time-frequency location having a highest or lowest frequency domain in the at least two sets of user data is determined as the target resource location;

or, a second resource location of user data with highest service priority in the at least two sets of user data is determined as the target resource location;

or, a second resource location of user data with a highest or lowest transmission physical layer parameter in the at least two sets of user data is determined as the target resource location.

Optionally, the operation that the combined information of respective HARQ feedback information of the at least two sets of user data is obtained may include that:

HARQ feedback information of user data corresponding to the target resource location is obtained as the combined information;

or, the respective HARQ feedback information of the at least two sets of user data is combined into the combined information; and or, the respective HARQ feedback information of the at least two sets of user data and an NACK corresponding to a same feedback resource location in time domain as the respective HARQ feedback information are combined into the combined information in a frequency domain order, the same feedback resource location in the time domain being other resource locations, which have an overlap with the respective second resource locations of the at least two sets of user data in the time domain, in the feedback resource pool.

In general, in the solutions of the embodiments of the present disclosure, after the first IOV device sends first user data to the second IOV device, the second IOV device may determine a resource location for sending HARQ feedback information of the first user data based on a resource location related to the first user data, and send the HARQ feedback information of the first user data based on the determined resource location, so that the first IOV device can receive the HARQ feedback information based on the same resource location. That is, the receiving end and the sending end of the IOV device may automatically determine the resource locations for sending/receiving the HARQ feedback information respectively based on the resource locations related to the user data, so that support for HARQ feedback in IOV communications is realized.

Figure 4:
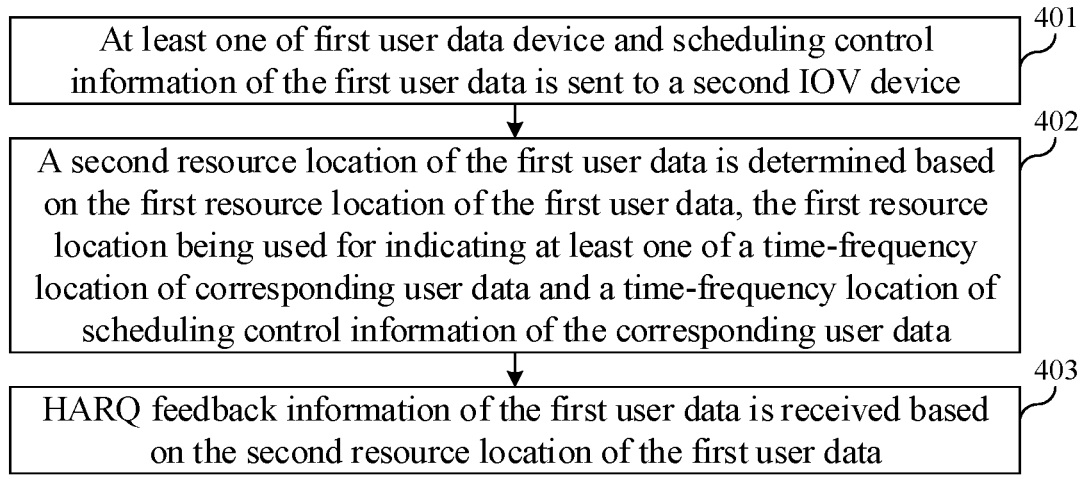
FIG. 4 is a flowchart of a method for transmitting feedback information between IOV devices according to an exemplary embodiment.

FIG. 4 is a flowchart of a method for transmitting feedback information between IOV devices according to an exemplary embodiment. The method may be performed by the first IOV device in the embodiment shown in FIG. 2. The method may include the following operations.

At operation S401, the first IOV device sends at least one of first user data device and scheduling control information of the first user data to a second IOV device.

At operation S402, the first IOV device determines a second resource location of the first user data based on the first resource location of the first user data, the first resource location indicating at least one of a time-frequency location of corresponding user data and a time-frequency location of scheduling control information of the corresponding user data.

At operation S403, the first IOV device receives HARQ feedback information of the first user data based on the second resource location of the first user data.

Optionally, the operation that the second resource location of the first user data is determined based on the first resource location of the first user data may include that:

the second resource location of the first user data is determined from the feedback resource pool based on the first resource location of the first user data.

A time-frequency resource in the feedback resource pool may be configured to send the HARQ feedback information; or, the HARQ feedback information may be sent through the time-frequency resource in the feedback resource pool; or, the time-frequency resource in the feedback resource pool may be configured to send the HARQ feedback information, and the HARQ feedback information may be sent through the time-frequency resource in the feedback resource pool.

Optionally, the operation that the HARQ feedback information of the first user data is received based on the second resource location of the first user data may include that:

the HARQ feedback information of the first user data is received on a time-frequency resource corresponding to the second resource location of the first user data;

or, the HARQ feedback information of the first user data is received on a time-frequency resource corresponding to the second resource location of the first user data and other resource locations which have an overlap with the second resource location of the first user data in time domain and are higher than the second resource location of the first user data in frequency domain in the feedback resource pool;

or, the HARQ feedback information of the first user data is received on a time-frequency resource corresponding to the second resource location of the first user data and other resource locations which have an overlap with the second resource location of the first user data in time domain and are lower than the second resource location of the first user data in frequency domain in the feedback resource pool.

In general, in the solutions of the embodiments of the present disclosure, after the first IOV device sends first user data to the second IOV device, a resource location that the second IOV device sends HARQ feedback information of the first user data may be determined based on a resource location related to the first user data, and the HARQ feedback information may be received based on the determined resource location. That is, the receiving end and the sending end of the IOV device may automatically determine the resource locations for sending/receiving the HARQ feedback information respectively based on the resource locations related to the user data, so that support for HARQ feedback in IOV communications is realized.

Figure 5:
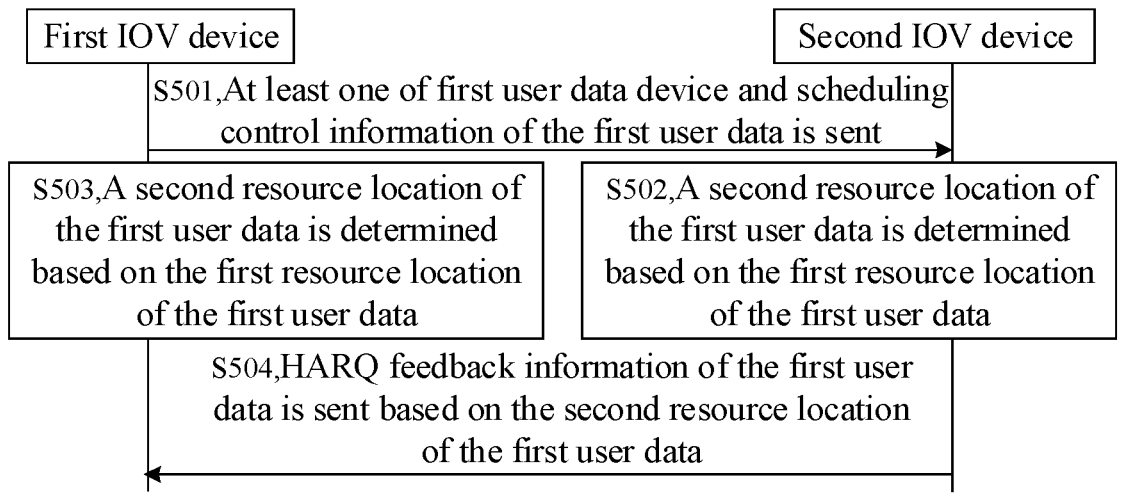
FIG. 5 is a flowchart of a method for transmitting feedback information between IOV devices according to an exemplary embodiment.

FIG. 5 is a flowchart of a method for transmitting feedback between IOV information devices according to an exemplary embodiment. As shown in FIG. 5, the method for transmitting feedback information between IOV devices is applicable to the implementation environment shown in FIG. 1. The method may include the following operations.

At operation S501, the first IOV device sends at least one of first user data device and scheduling control information of the first user data to a second IOV device, and the second IOV device receives at least one of first user data device and scheduling control information of the first user data.

The first IOV device may send the first user data to the second IOV device through a sidelink. The sidelink is a direct device-to-device link. Correspondingly, the second IOV device may receive the first user data from the first IOV device through the sidelink.

When sending the first user data, the first IOV device may also send the scheduling control information corresponding to the first user data.

Figure 6:
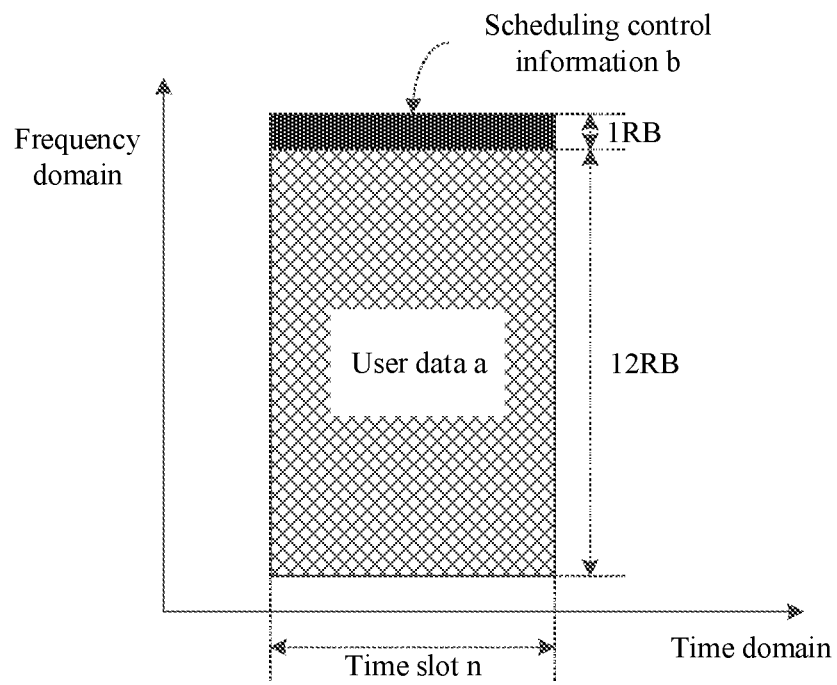
FIG. 6 is a schematic diagram of resource occupation of user data and scheduling control information involved in the embodiment shown in FIG. 5.

In a possible implementation mode, the first user data and the scheduling control information of the first user data may be adjacent in frequency domain and the same in time domain. For example, FIG. 6 is a schematic diagram of resource occupation of user data and scheduling control information involved in the embodiment of the present disclosure. As shown in FIG. 6, user data a occupies 12 Resource Blocks (RB) in the frequency domain, scheduling control information b of the user data a occupies 1 RB in the frequency domain, the user data a and the scheduling control information b are adjacent in the frequency domain, and the user data a and the scheduling control information b are in the same time slot n in the time domain.

At operation S502, the second IOV device determines a second resource location of the first user data based on the first resource location of the first user data.

Optionally, in response to determining the second resource location of the first user data, the second IOV device may determine a second resource location of the first user data from a feedback resource pool based on the first resource location of the first user data.

In the embodiments of the present disclosure, the communication system may allocate the dedicated time-frequency resources for transmission of the HARQ feedback information, and associate the data transmission with the corresponding HARQ feedback transmission through mapping relationships between time-frequency resource locations for transmission of HARQ feedback information and time-frequency resource locations for transmission of data/scheduling control information. That is, the time-frequency resource locations used for transmission of HARQ feedback information correspond to the time-frequency resource locations for corresponding transmission of data or correspond to the time-frequency resource locations used for transmission of scheduling control information (for example, SA).

For example, the IOV device may configure a time-frequency resource pool for transmission of the HARQ feedback information (that is, the feedback resource pool) through a preset configuration mode or a downlink configuration mode at the base station side. The feedback resource pool may have the following characteristics.

1) The time-frequency resources in the feedback resource pool are used for transmission of the HARQ feedback information.

In a possible implementation mode, the time-frequency resources in the feedback resource pool can only be configured to transmit the HARQ feedback information and cannot be configured to transmit other information. For example, the time-frequency resources cannot be configured to transmit user data or scheduling control information of the user data. Optionally, in the implementation mode, the HARQ feedback information is not limited to being transmitted in the feedback resource pool, that is, the HARQ feedback information may be transmitted in or outside the feedback resource pool.

2) The time-frequency resources in the feedback resource pool are used for transmission of the HARQ feedback information.

In another possible implementation mode, the HARQ feedback information can only be transmitted in the feedback resource pool and cannot be transmitted outside the feedback resource pool. Optionally, in this implementation mode, the resource in the feedback resource pool is not limited to transmitting the HARQ feedback information. For example, the time-frequency resources in the feedback resource pool may also be configured to transmit user data or scheduling control information of the user data besides the HARQ feedback information.

3) The time-frequency resources in the feedback resource pool are configured to transmit the HARQ feedback information, and the transmission of the HARQ feedback information uses the time-frequency resources in the feedback resource pool.

In yet another possible implementation mode, the HARQ feedback information can only be transmitted in the feedback resource pool, not outside the feedback resource pool, and the time-frequency resources in the feedback resource pool can only be configured to transmit the HARQ feedback information and cannot be configured to transmit user data or other information such as scheduling control information of the user data.

In the solutions of the present disclosure, by configuring the time-frequency resources for transmitting the HARQ feedback information, the probability of collision between transmission of HARQ feedback information and transmission of other information may be reduced effectively.

Further, the solutions of the present disclosure may divide the feedback resource pool into a plurality of time-frequency units for the transmission of the HARQ feedback information, and the transmission of the HARQ feedback information may be performed in each time-frequency unit once.

For example, in time domain, a time-frequency unit for transmitting the HARQ feedback information may occupy one or more slots. Or, a time-frequency unit for transmitting the HARQ feedback information may also occupy less than one slot, for example, taking that a slot is divided into 14 Orthogonal Frequency Division Multiplexing (OFDM) symbols as an example, a time-frequency unit for transmitting the HARQ feedback information may occupy 1 to 13 symbols in the slot.

In frequency domain, a time-frequency unit for transmitting the HARQ feedback information may occupy 1, 2 or more RBs. Or, a time-frequency unit for transmitting the HARQ feedback information may also occupy less than one RB, for example, a time-frequency unit for transmitting the HARQ feedback information may occupy 2, 3, 4 or 6 subcarriers.

Optionally, different time-frequency units for transmitting the HARQ feedback information may be multiplexed by time division, frequency division or code division.

At operation S503, the first IOV device determines a second resource location of the first user data based on the first resource location of the first user data.

The first IOV device may also determine the second resource location of the first user data from a feedback resource pool based on the first resource location of the first user data. The first IOV device may determine the second resource location of the first user data in a manner similar to how the second IOV device determines the second resource location of the first user data, seeing the description of S502 for details, which will not be repeated here.

The embodiments of the present disclosure do not limit the sequence of performing S502 and S503. In practical applications, after learning the first resource location of the first user data, the first IOV device or the second IOV device may determine the second resource location of the first user data based on the first resource location of the first user data.

At operation S504, the second IOV device sends the HARQ feedback information of the first user data based on the second resource location of the first user data, and the first IOV device receives HARQ feedback information of the first user data based on the second resource location of the first user data.

In a possible implementation mode, when sending the HARQ feedback information of the first user data to the first IOV device based on the second resource location of the first user data, the second IOV device may first determine a time-frequency unit corresponding to the second resource location of the first user data according to a preset mapping rule, and then send the HARQ feedback information of the first user data to the first IOV device on the time-frequency unit corresponding to the second resource location of the first user data. The preset mapping rule may include mapping relationships between the time-frequency resource locations in the data resource pool and the time-frequency units in the feedback resource pool, or the preset mapping rule may include mapping relationships between time-frequency resource locations in a scheduling control information resource pool and the plurality of time-frequency units in the feedback resource pool. The data resource pool may be a resource pool configured to transmit user data, and the scheduling control information resource pool may be a resource pool configured to transmit the scheduling control information of the user data.

In the embodiments of the present disclosure, at a given time-frequency resource location for transmitting user data and/or at a given time-frequency resource location for transmitting scheduling control information used for scheduling data transmission, an IOV device may determine one or more time-frequency units for sending HARQ feedback information of the user data according to the preset mapping relationship.

There may be several mapping relationships. In the embodiments of the present disclosure, the following three mapping relationships are taken as examples for illustrating that an IOV device determines a resource location (that is, the second resource location) for transmission of HARQ feedback information based on a time-frequency resource location for transmitting user data and/or a given time-frequency resource location (corresponding to the first resource location) used by scheduling control information of scheduling data transmission.

1) The first resource location and the second resource location are the same in frequency domain, but are different in time domain.

Figure 7:
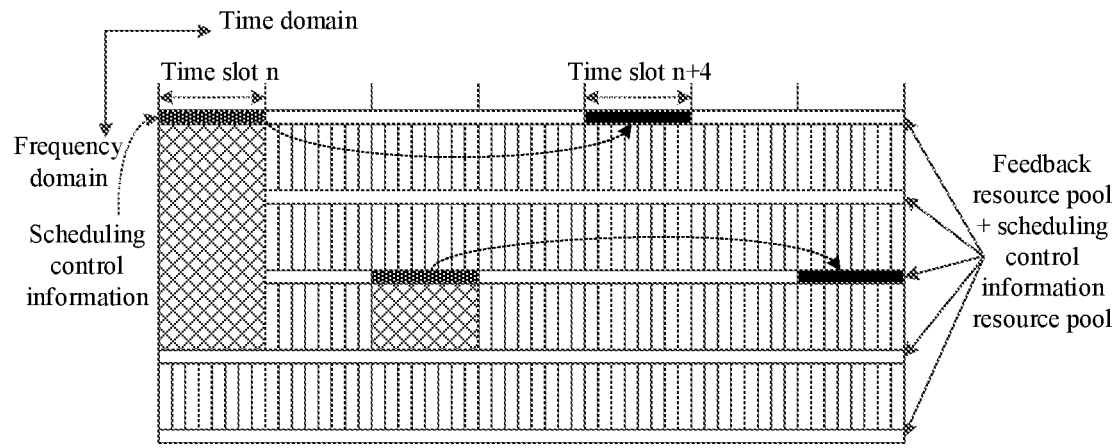
FIG. 7 is a schematic diagram of resource mapping involved in the embodiment shown in FIG. 5.

For example, FIG. 7 is a schematic diagram of resource mapping involved in the embodiment of the present disclosure. As shown in FIG. 7, assuming that the last symbol of the first user data and/or the scheduling control information of the first user data is in the slot n, and it is preset that transmission of HARQ feedback information of the user data occurs in the K-th slot after the slot n (that is, slot n+K, K being a parameter, for example, in FIG. 7, the value of K is 4), then the starting location of the frequency resource configured to transmit the HARQ feedback information is the same as that used for the transmission of the scheduling control information corresponding to the transmission of the first user data. That is, in FIG. 7, the feedback resource pool is the same as the resource pool used by the scheduling control information.

2) The first resource location and the second resource location are different in frequency domain and are also different in time domain.

Figure 8:
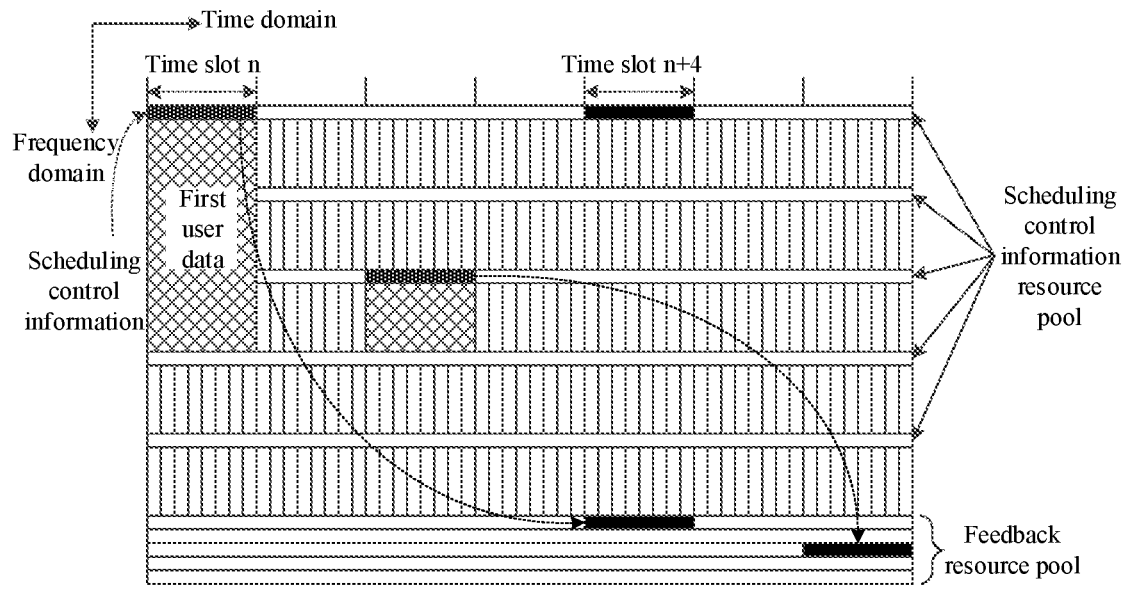
FIG. 8 is another schematic diagram of resource mapping involved in the embodiment shown in FIG. 5.

For example, FIG. 8 is another schematic diagram of resource mapping involved in the embodiment of the present disclosure. As shown in FIG. 8, assuming that the last symbol of the first user data and/or the scheduling control information of the first user data is in the slot n, and it is preset that the transmission of the HARQ feedback information of the user data occurs in the K-th slot after the slot n (that is, slot n+K, K being a parameter, for example, in FIG. 8, the value of K is 4), then the starting location of the frequency resource used for the transmission of the HARQ feedback information corresponds to the starting location of the frequency resource used for the transmission of the scheduling control information of the first user data. For example, the starting location of the frequency resource of the first user data is subcarrier 1, subcarrier 2 or subcarrier 3, correspondingly the starting location of the frequency resource used by the HARQ feedback information is the first, second or third frequency resource in the feedback resource pool. That is, in FIG. 8, the feedback resource pool is different from the resource pool used by the scheduling control information, and they are frequency-multiplexed with each other.

3) The first resource location and the second resource location are in different resource pool cycles.

Figure 9:
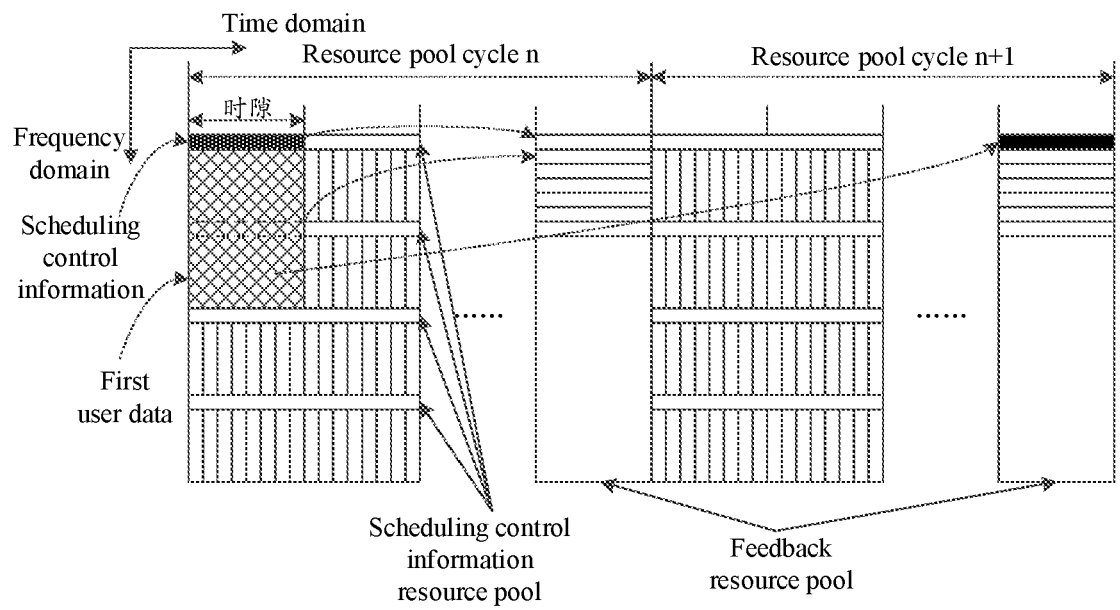
FIG. 9 is another schematic diagram of resource mapping involved in the embodiment shown in FIG. 5.

For example, FIG. 9 is another schematic diagram of resource mapping involved in the embodiment of the present disclosure. As shown in FIG. 9, the resource pool used by the scheduling control information and the feedback resource pool are set periodically. Assuming that the transmission of the given scheduling control information occurs in the n-th cycle of the resource pool used by the scheduling control information, then HARQ feedback information may be transmitted in a feedback resource pool in the (n+K)-th cycle of the resource pool used by the scheduling control information. For example, in FIG. 9, the value of K is 1, that is, the HARQ feedback information is transmitted in the next resource pool cycle of the resource pool cycle where the scheduling control information of the first user data is, and the time-frequency units in the feedback resource pool and resource units of the scheduling control information correspond to each other in a fixed format. For example, the resource units of the scheduling control information correspond to the time-frequency units in the feedback resource pool in the order of first frequency domain and then time domain, or first time domain and then frequency domain. As an example, in FIG. 9, there is no overlap between the resource pool used by the scheduling control information and the feedback resource pool, and the time-frequency units in the feedback resource pool are arranged in the order of frequency domains from small to large; correspondingly, as shown by the dotted line in FIG. 9, the resource unit with the earliest time domain and the lowest frequency domain in the resource pool used by the scheduling control information corresponds to the time-frequency unit with the lowest frequency in the feedback resource pool, the resource unit with the earliest time domain and the second lowest frequency domain in the resource pool used by the scheduling control information corresponds to the time-frequency unit with the second lowest frequency in the feedback resource pool, and so on. In FIG. 9, the resource unit of the scheduling control information of the first user data is the resource with the earliest time domain and the lowest frequency domain in the resource pool used by the scheduling control information, and correspondingly, the time-frequency unit of the HARQ feedback information is the time-frequency unit with the lowest frequency in the feedback resource pool in the next resource pool cycle.

When transmitting the user data and the scheduling control information of the user data, a data sender (that is, the first IOV device) may transmit the same data multiple times on different time-frequency resources, which is also called repetition. For example, in LTE, the data sender usually transmits the same data twice on different time-frequency resources, and the user data transmitted for the second time is the retransmission of the user data transmitted for the first time.

In the embodiments of the present disclosure, in the case of data retransmission, a data receiver (that is, the second IOV device) may send HARQ feedback information in the following two ways.

A) When the first user data is user data that needs to be transmitted repeatedly, the second IOV device sends the HARQ feedback information of the first user data in present repeated transmission based on the second resource location of the first user data in each repeated transmission.

Figure 10:
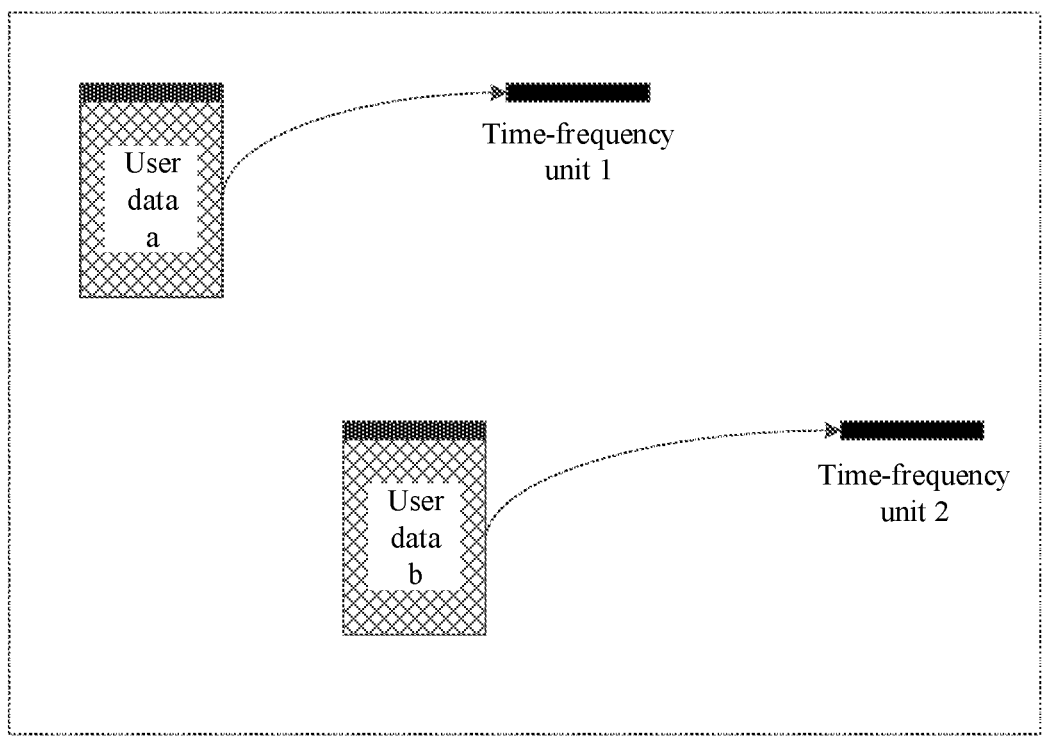
FIG. 10 is a schematic diagram of transmission of HARQ feedback information involved in the embodiment shown in FIG. 5.

For example, FIG. 10 is a schematic diagram of transmission of HARQ feedback information involved in the embodiment of the present disclosure. As shown in FIG. 10, user data a and user data b represent the same user data in two transmissions. The user data a is transmitted for the first time, and the user data b is transmitted for the second time. The time-frequency resource of the user data a and the scheduling control information of the user data a is different from the time-frequency resource of the user data b and the scheduling control information of the user data b. The resource location used by the HARQ feedback information of the user data a corresponds to the time-frequency unit 1, and the resource location used by the HARQ feedback information of the user data b corresponds to the time-frequency unit 2. After receiving the user data a and the user data b, the second IOV device may send the HARQ feedback information of the user data a on the time-frequency unit 1, and send the HARQ feedback information of the user b on the time-frequency unit 2.

B) When the first user data is user data that needs to be transmitted repeatedly, the second IOV device sends the HARQ feedback information of the first user data based on the second resource location of the first user data in last repeated transmission.

Figure 11:
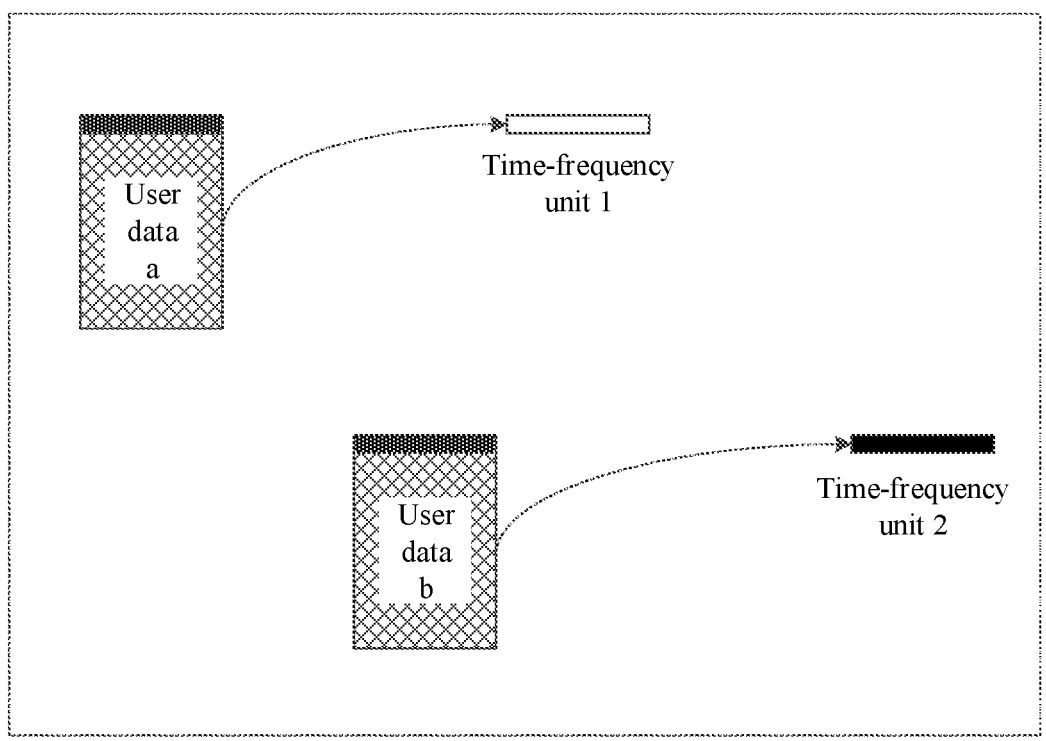
FIG. 11 is another schematic diagram of transmission of HARQ feedback information involved in the embodiment shown in FIG. 5.

For example, FIG. 11 is another schematic diagram of transmission of HARQ feedback information involved in the embodiment of the present disclosure. As shown in FIG. 11, user data a and user data b are the same user data in two transmissions. The user data a is transmitted for the first time, and the user data b is transmitted for the second time. The resource location used by the HARQ feedback information of the user data a corresponds to the time-frequency unit 1, and the resource location used by the HARQ feedback information of the user data b corresponds to the time-frequency unit 2. As shown in FIG. 11, after receiving the user data a and the user data b, the second IOV device does not send the HARQ feedback information of the user data a on the time-frequency unit 1, but sends the HARQ feedback information of the user b only on the time-frequency unit 2.

Optionally, if the first user data is one of at least two sets of user data received by the second IOV device, and the second resource locations of the at least two sets of user data have an overlap in the time domain, then the second IOV device may determine a target resource location when sending the HARQ feedback information of the first user data to the first IOV device based on the second resource location of the first user data, the target resource location being one of the second resource locations of the at least two sets of user data. Combined information of respective HARQ feedback information of the at least two sets of user data may be obtained, the combined information including part or all of the HARQ feedback information of the at least two sets of user data. The combined information may be sent on the time-frequency resource corresponding to the target resource location.

In practical applications, if multiple time-frequency units for transmitting the HARQ feedback information exist at different frequency-domain locations and a same time-domain location in the feedback resource pool, and the second IOV device receives multiple different data transmissions, then feedback resources corresponding to these data transmissions may be mapped onto different time-frequency units in frequency domain resources at the same time. If the second IOV device sends continuous or discontinuous signals at multiple frequency-domain locations while sending the HARQ feedback information, the Peak to Average Power Ratio (PAPR) of the sent signal may be increased, which results in the decrease of signal demodulation performance.

In order to avoid the above case and ensue the signal demodulation performance, in the embodiments of the present disclosure, when the second IOV device sends the HARQ feedback information of the first user data, if HARQ feedback information of other user data needing to be sent exists in the time domain involving the overlap, then the second IOV device may combine multiple pieces of HARQ feedback information that are sent in the time domain involving the overlap, and send the combined information on the second resource location of one of multiple pieces of user data, that is, only one of multiple feedback resources needing to send the HARQ feedback information at the same time is selected to send the HARQ feedback information.

Optionally, the second IOV device may select the target resource location in the following ways.

1) A resource location with a highest or lowest frequency is determined by the second IOV device from the second resource locations of the at least two sets of user data as the target resource location.

Figure 12:
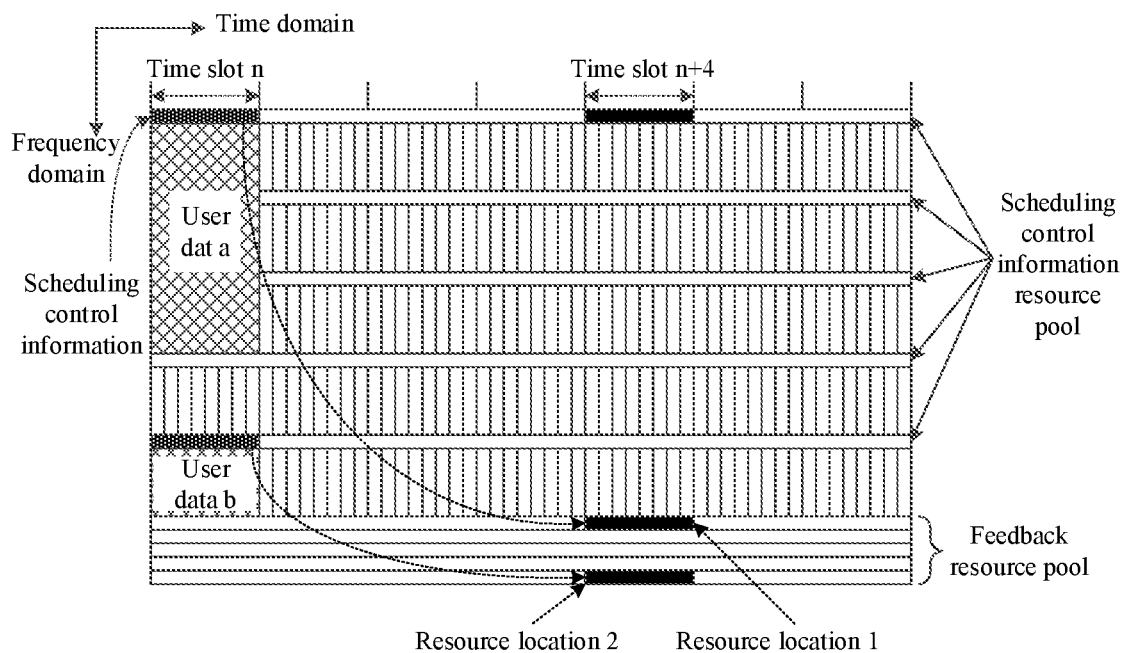
FIG. 12 is a schematic diagram of resource location correspondence involved in the embodiment shown in FIG. 5.

For example, FIG. 12 is a schematic diagram of correspondence of resource locations involved in the embodiment of the present disclosure. As shown in FIG. 12, the time-frequency locations of the user data a and user data b are the same or partially overlapped in time domain. The second resource location of the user data a corresponds to the resource location 1 in FIG. 12, and the second resource location of the user data b corresponds to the resource location 2 in FIG. 12. The second IOV device may determine the resource location 2 with the highest frequency in resource location 1 and resource location 2 as the time-frequency location according to a preset determining rule, or the second IOV device may determine the resource location 2 with the lowest frequency in resource location 1 and resource location 2 as the target resource location according to the preset determining rule.

2) A second resource location of user data with an initial time-frequency location having an earliest or latest time domain in the at least two sets of user data is determined by the second IOV device as the target resource location.

Still taking FIG. 12 for example, the initial time-frequency location of the user data a is earlier than the initial time-frequency location of the user data b in time domain, then the second IOV device may determine the resource location 1 corresponding to the user data a with the initial time-frequency location in the earliest time domain as the target resource location according to the preset determining rule, or the second IOV device may determine the resource location 2 corresponding to the user data b with the initial time-frequency location in the latest time domain as the target resource location according to the preset determining rule.

3) A second resource location of the user data with the highest or the lowest frequency domain of the initial time-frequency location in the at least two sets of user data is determined by the second IOV device as the target resource location.

Taking FIG. 12 for example, assuming that the initial time-frequency location of the user data a is lower than the initial time-frequency location of the user data b in frequency domain, then the second IOV device may determine the resource location 1 corresponding to the user data a with the initial time-frequency location in the lowest frequency domain as the target resource location according to the preset determining rule, or the second IOV device may determine the resource location 2 corresponding to the user data b with the initial time-frequency location in the highest frequency domain as the target resource location according to the preset determining rule.

4) A second resource location of user data with highest service priority in the at least two sets of user data is determined by the second IOV device as the target resource location.

Taking FIG. 12 for example, assuming that the service priority of the user data a is higher than the service priority of the user data b, then the second IOV device may determine the resource location 1 corresponding to user data with highest service priority as the target resource location according to the preset determining rule, or the second IOV device may determine the resource location 2 corresponding to the user data with the lowest service priority as the target resource location according to the preset determining rule.

5) A second resource location of the user data with the highest or the lowest transmission physical layer parameter in the at least two sets of user data is determined by the second IOV device as the target resource location.

The transmission physical layer parameter may be an MCS index value. Taking FIG. 12 for example, assuming that the MCS index value of the user data a is lower than the MCS index value of the user data b, then the second IOV device may determine the resource location 1 corresponding to the user data with the lowest MCS index value as the target resource location according to the preset determining rule, or the second IOV device may determine the resource location 2 corresponding to the user data with the highest MCS index value as the target resource location according to the preset determining rule.

Optionally, the second IOV device may obtain the combined information of respective HARQ feedback information of the at least two sets of user data in the following three ways.

1) The second IOV device obtains the HARQ feedback information of the user data corresponding to the target resource location as the combined information.

In a possible implementation mode, for the at least two sets of user data, after determining the target resource location, the second IOV device may transmit the HARQ feedback information that is intended to be transmitted at the target resource location, while other HARQ feedbacks that need to be transmitted at a same position in time domain is dropped.

Taking FIG. 12 for example, assuming that the HARQ feedback information corresponding to the user data a in FIG. 12 is the HARQ feedback information 1, the HARQ feedback information corresponding to the user data b is the HARQ feedback information 2, and the determined target resource location is the resource location 1 corresponding to the HARQ feedback information 1, then the second IOV device may transmit the HARQ feedback information 1 on the time-frequency unit at the resource location 1, and the HARQ feedback information 2 is not transmitted.

2) The second IOV device combines the HARQ feedback information of the at least two sets of user data into the combined information.

In another possible implementation mode, for the at least two sets of user data, after determining the target resource location, the second IOV device may combine all the HARQ feedback information to be transmitted at the same time and then transmit it on the selected feedback resource.

Taking FIG. 12 for example, assuming that the HARQ feedback information corresponding to the user data a in FIG. 12 is the HARQ feedback information 1, the HARQ feedback information corresponding to the user data b is the HARQ feedback information 2, and the determined target resource location is the resource location 1 corresponding to the HARQ feedback information 1, then the second IOV device may transmit the HARQ feedback information 1 and the HARQ feedback information 2 on the time-frequency unit at the resource location 1.

3) The second IOV device combines respective HARQ feedback information of the at least two sets of user data and an NACK corresponding to a same feedback resource location in time domain as the respective HARQ feedback information into the combined information in the frequency domain order, the same feedback resource location in the time domain being other resource locations, which have an overlap with the respective second resource locations of the at least two sets of user data in the time domain, in the feedback resource pool.

In yet another possible implementation mode, in order to avoid the problem that it is complex to receive the feedback information caused by different amounts of feedback information brought by different number of data transmissions, for the at least two sets of user data, after determining the target resource location, the second IOV device may also combine all the HARQ feedback information (with or without data transmission) fed back at the same time or at the time with overlap for transmission. If there is no transmission on the data/scheduling control information transmission resource corresponding to a certain feedback resource, the transmission is performed based on NACK.

For example, taking FIG. 12 for example, assuming that the HARQ feedback information corresponding to the user data a in FIG. 12 is the HARQ feedback information 1, the HARQ feedback information corresponding to the user data b is the HARQ feedback information 2, and there are three resource locations in the feedback resource pool, which are in the same time domain as the resource location 1 and the resource location 2 and in which no feedback resource pool is transmitted, and the three resource locations are between the resource location 1 and the resource location 2, and assuming that the determined target resource location is the resource location 1 corresponding to the HARQ feedback information 1, then the second IOV device may transmit the HARQ feedback information 1+NACK+NACK+NACK+ the HARQ feedback information 2 from low frequency to high frequency at the resource location 1, or the second IOV device may transmit the HARQ feedback information 2+NACK+NACK+NACK+the HARQ feedback information 1 from high to low frequency at the resource location 1.

Optionally, the first IOV device may receive HARQ feedback information of the first user data based on the second resource location of the first user data in the following three ways.

1) The first IOV device receives HARQ feedback information of the first user data on the time-frequency resource corresponding to the second resource location of the first user data.

In the embodiments of the present disclosure, the second IOV device may send the HARQ feedback information at the corresponding time-frequency resource location of the HARQ feedback information based on the time-frequency resource location for transmitting the received user data and/or scheduling control information. Correspondingly, the first IOV device may monitor the HARQ feedback information on the corresponding time-frequency resource location after sending the user data.

2) The first IOV device receives HARQ feedback information of the first user data on the time-frequency resource corresponding to the second resource location of the first user data and other resource locations, which are the same as the second resource location of the first user data in the time domain and are higher than the second resource location of the first user data in the frequency domain, in the feedback resource pool.

3) The first IOV device receives HARQ feedback information of the first user data on the time-frequency resource corresponding to the second resource location of the first user data and other resource locations which have an overlap with the second resource location of the first user data in the time domain and are lower than the second resource location of the first user data in the frequency domain in the feedback resource pool.

If the second IOV device selects, during sending the HARQ feedback information, only one of multiple feedback resources that need to send the HARQ feedback information at the same time to send the HARQ feedback information, then when monitoring the HARQ feedback information, the first IOV device needs to monitor not only on the feedback time-frequency unit corresponding to its data transmission, but also on other time-frequency units with higher priority on which the second IOV device may send feedback.

For example, still taking FIG. 12 for example, assuming that the target transmission locations are selected from low to high frequency domain, then the IOV device sending the user data a only needs to monitor the resource location of the HARQ feedback information 1 (because the resource location has the highest priority), while the IOV device sending the user data b not only needs to monitor the resource location of the HARQ feedback information 2, but also needs to monitor the resource location of the HARQ feedback information 1 which has a higher priority and the other three resource locations that have no corresponding transmission of the HARQ feedback information.

To sum up, after the first IOV device sends the first user data to the second IOV device, the second IOV device may determine the resource location for sending the HARQ feedback information of the first user data based on a resource location related to the first user data, and send the HARQ feedback information of the first user data based on the determined resource location. The first IOV device may receive HARQ feedback information from the second IOV device at the same resource location. That is, the resource location of the HARQ feedback information may be determined based on the resource location corresponding to the user data, without configuring a center node for scheduling feedback resources, so that support for HARQ feedback in IOV communications is realized.

The following is apparatus embodiments of the present disclosure, which may be used to perform the method embodiments of the present disclosure. The details undisclosed in the apparatus embodiments of the present disclosure may be understood with reference to the method embodiments of the present disclosure.

Figure 13:
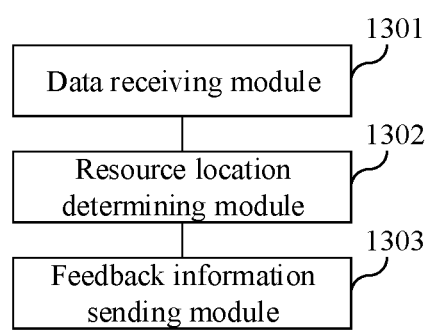
FIG. 13 is a block diagram of an apparatus for transmitting feedback information between IOV devices according to an exemplary embodiment.

FIG. 13 is a block diagram of an apparatus for transmitting feedback information between IOV devices according to an exemplary embodiment. As shown in FIG. 13, the apparatus for transmitting feedback information between IOV devices may be implemented into all or part of an IOV device in the implementation environment shown in FIG. 1 through hardware or a combination of software and hardware to execute the operations executed by the second IOV device in the embodiment shown in any one of FIG. 2 or FIG. 3 or FIG. 5. The apparatus for transmitting feedback information between IOV devices may include:

a data receiving module 1301, configured to receive at least one of first user data and scheduling control information of the first user data from a first IOV device;

a resource location determining module 1302, configured to determine a second resource location of the first user data based on the first resource location of the first user data, the first resource location indicating at least one of a time-frequency location of corresponding user data and a time-frequency location of scheduling control information of the corresponding user data; and a feedback information sending module 1303, configured to send HARQ feedback information of the first user data to the first IOV device based on the second resource location of the first user data.

Optionally, the resource location determining module 1302 is specifically configured to determine a second resource location of the first user data from a feedback resource pool based on the first resource location of the first user data.

A time-frequency resource in the feedback resource pool may be configured to send the HARQ feedback information; or, the HARQ feedback information may be sent through the time-frequency resource in the feedback resource pool; or, the time-frequency resource in the feedback resource pool may be configured to send the HARQ feedback information, and the HARQ feedback information may be sent through the time-frequency resource in the feedback resource pool.

Optionally, the feedback resource pool may include a plurality of time-frequency units. The HARQ feedback information sending module 1303 may specifically include:

a time-frequency unit determining submodule, configured to determine the time-frequency unit corresponding to the second resource location of the first user data according to a preset mapping rule, the preset mapping rule including mapping relationships between time-frequency resource locations in a data resource pool and the plurality of time-frequency units in the feedback resource pool, or the preset mapping rule including mapping relationships between time-frequency resource locations in a scheduling control information resource pool and the plurality of time-frequency units in the feedback resource pool, the data resource pool being a resource pool configured to transmit user data, and the scheduling control information resource pool being a resource pool configured to transmit scheduling control information of the user data; and a feedback information sending submodule, configured to send HARQ feedback information of the first user data to the first IOV device on the time-frequency unit corresponding to the second resource location of the first user data.

Optionally, the HARQ feedback information sending module 1303 is specifically configured to:

when the first user data is user data that needs to be transmitted repeatedly, send HARQ feedback information of the first user data based on the second resource location of the first user data in last repeated transmission;

or, when the first user data is user data that needs to be transmitted repeatedly, send the HARQ feedback information of the first user data in present repeated transmission based on the second resource location of the first user data in each repeated transmission.

Optionally, the first user data is one of at least two sets of user data received by the second IOV device, and respective second resource locations of the at least two sets of user data have an overlap in time domain. The HARQ feedback information sending module 1303 may include:

a location determining submodule, configured to determine a target resource location, the target resource location being one of the second resource locations of the at least two sets of user data;

a combined information obtaining submodule, configured to obtain combined information of respective HARQ feedback information of the at least two sets of user data, the combined information including part or all of the HARQ feedback information of the at least two sets of user data; and a combined information sending submodule, configured to send the combined information on a time-frequency resource corresponding to the target resource location.

Optionally, the location determining submodule is specifically configured to:

determine a resource location with a highest or lowest frequency from the second resource locations of the at least two sets of user data as the target resource location;

or, determine a second resource location of user data with an initial time-frequency location having an earliest or latest time domain in the at least two sets of user data as the target resource location;

or, determine a second resource location of user data with an initial time-frequency location having a highest or lowest frequency domain in the at least two sets of user data as the target resource location;

or, determine a second resource location of user data with highest service priority in the at least two sets of user data as the target resource location;

or, determine a second resource location of user data with a highest or lowest transmission physical layer parameter in the at least two sets of user data as the target resource location.

Optionally, the combined information obtaining submodule is specifically configured to:

obtain HARQ feedback information of user data corresponding to the target resource location as the combined information;

or, combine the respective HARQ feedback information of the at least two sets of user data into the combined information;

or, combine the respective HARQ feedback information of the at least two sets of user data and an NACK corresponding to a same feedback resource location in time domain as the respective HARQ feedback information into the combined information in a frequency domain order, the same feedback resource location in the time domain being other resource locations, which have an overlap with the respective second resource locations of the at least two sets of user data in the time domain, in the feedback resource pool.

In general, in the solutions of the embodiments of the present disclosure, after the first IOV device sends first user data to the second IOV device, the second IOV device may determine a resource location for sending HARQ feedback information of the first user data based on a resource location related to the first user data, and send the HARQ feedback information of the first user data based on the determined resource location, so that the first IOV device can receive the HARQ feedback information based on the same resource location. That is, the receiving end and the sending end of the IOV device may automatically determine a resource location for sending/receiving the HARQ feedback information respectively based on the resource location related to the user data, so that support for HARQ feedback in IOV communications is realized.

Figure 14:
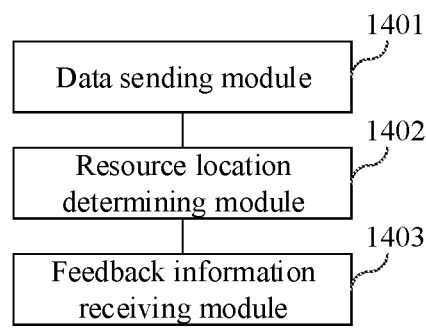
FIG. 14 is a block diagram of an apparatus for transmitting feedback information between IOV devices according to an exemplary embodiment.

FIG. 14 is a block diagram of an apparatus for transmitting feedback information between IOV devices according to an exemplary embodiment. As shown in FIG. 14, the apparatus for transmitting feedback information between IOV devices may be implemented as all or part of an IOV device in the implementation environment shown in FIG. 1 through hardware or a combination of software and hardware to execute the operations executed by the first IOV device in the embodiment shown in any one of FIG. 2 or FIG. 4 or FIG. 5. The apparatus for transmitting feedback information between IOV devices may include:

- a data sending module 1401, configured to send at least one of first user data device and scheduling control information of the first user data to a second IOV device;
- a resource location determining module 1402, configured to determine a second resource location of the first user data based on the first resource location of the first user data, the first resource location indicating at least one of a time-frequency location of corresponding user data and a time-frequency location of scheduling control information of the corresponding user data; and
- a feedback information receiving module 1403, configured to receive HARQ feedback information of the first user data based on the second resource location of the first user data.

Optionally, the resource location determining module 1402 is specifically configured to determine a second resource location of the first user data from a feedback resource pool based on the first resource location of the first user data.

A time-frequency resource in the feedback resource pool may be configured to send the HARQ feedback information. Or, the HARQ feedback information may be sent through the time-frequency resource in the feedback resource pool. Or, the time-frequency resource in the feedback resource pool may be configured to send the HARQ feedback information, and the HARQ feedback information may be sent through the time-frequency resource in the feedback resource pool.

Optionally, the HARQ feedback information receiving module 1403 is specifically configured to:

receive HARQ feedback information of the first user data on a time-frequency resource corresponding to the second resource location of the first user data;

or, receive HARQ feedback information of the first user data on a time-frequency resource corresponding to the second resource location of the first user data and other resource locations which have an overlap with the second resource location of the first user data in time domain and are higher than the second resource location of the first user data in frequency domain in the feedback resource pool;

or, receive HARQ feedback information of the first user data on a time-frequency resource corresponding to the second resource location of the first user data and other resource locations which have an overlap with the second resource location of the first user data in time domain and are lower than the second resource location of the first user data in frequency domain in the feedback resource pool.

In general, in the solutions of the embodiments of the present disclosure, after the first IOV device sends first user data to the second IOV device, a resource location that the second IOV device sends HARQ feedback information of the first user data may be determined based on a resource location related to the first user data, and the HARQ feedback information may be received based on the determined resource location. That is, the receiving end and the sending end of the IOV device may automatically determine the resource location for sending/receiving the HARQ feedback information respectively based on the resource location related to the user data, so that support for HARQ feedback in IOV communications is realized.

An exemplary embodiment of the present disclosure also provides a system for transmitting feedback information between IOV devices. The system includes: a first IOV device and a second IOV device.

The first IOV device includes the apparatus for transmitting feedback information between IOV devices provided in the embodiment shown in FIG. 14.

The second IOV device includes the apparatus for transmitting feedback information between IOV devices provided in the embodiment shown in FIG. 13.

It is to be noted that when the above functions are realized, the apparatuses provided in the above embodiments are only described with division of all above functional modules as an example. During a practical application, the above functions may be allocated to different functional modules for realization based on a practical requirement, that is, the content and structure of devices can be divided into different functional modules to realize all or part of the functions described above.

With respect to the apparatuses in the above embodiments, the specific manners for performing operations for individual modules therein have been described in detail in the embodiments regarding the methods, which will not be elaborated herein.

An exemplary embodiment of the present disclosure provides an apparatus for transmitting feedback information between IOV devices, which may implement all or part of the operations executed by the second IOV device in the embodiments of the present disclosure shown in FIG. 2, FIG. 3 or FIG. 5. The apparatus for transmitting feedback information between IOV devices includes a processor and a memory configured to store an instruction executable by the processor.

The processor is configured to:

receive at least one of first user data and scheduling control information of the first user data from a first IOV device;

determine a second resource location of the first user data based on a first resource location of the first user data, the first resource location indicating at least one of a time-frequency location of corresponding user data and a time-frequency location of scheduling control information of the corresponding user data; and send HARQ feedback information of the first user data to the first IOV device based on the second resource location of the first user data.

Optionally, the operation of determining the second resource location of the first user data based on the first resource location of the first user data may include:

determining the second resource location of the first user data from a feedback resource pool based on the first resource location of the first user data.

A time-frequency resource in the feedback resource pool may be configured to send the HARQ feedback information. Or, the HARQ feedback information may be sent through the time-frequency resource in the feedback resource pool. Or, the time-frequency resource in the feedback resource pool may be configured to send the HARQ feedback information, and the HARQ feedback information may be sent through the time-frequency resource in the feedback resource pool.

Optionally, the feedback resource pool may include a plurality of time-frequency units. The operation of sending the HARQ feedback information of the first user data to the first IOV device based on the second resource location of the first user data may include:

determining a time-frequency unit corresponding to the second resource location of the first user data according to a preset mapping rule, wherein the preset mapping rule comprises mapping relationships between time-frequency resource locations in a data resource pool and the plurality of time-frequency units in the feedback resource pool, or, the preset mapping rule comprises mapping relationships between time-frequency resource locations in a scheduling control information resource pool and the plurality of time-frequency units in the feedback resource pool, where the data resource pool is a resource pool configured to transmit user data, and the scheduling control information resource pool is a resource pool configured to transmit scheduling control information of the user data; and sending the HARQ feedback information of the first user data to the first IOV device on the time-frequency unit corresponding to the second resource location of the first user data.

Optionally, the operation of sending the HARQ feedback information of the first user data to the first IOV device based on the second resource location of the first user data may include:

when the first user data is user data that needs to be transmitted repeatedly, sending the HARQ feedback information of the first user data based on the second resource location of the first user data in last repeated transmission;

or, when the first user data is user data that needs to be transmitted repeatedly, sending the HARQ feedback information of the first user data in present repeated transmission based on the second resource location of the first user data in each repeated transmission.

Optionally, the first user data may be one of at least two sets of user data received by the second IOV device, and respective second resource locations of the at least two sets of user data have an overlap in time domain.

The operation of sending the HARQ feedback information of the first user data to the first IOV device based on the second resource location of the first user data may include that:

determining a target resource location, the target resource location being one of the second resource locations of the at least two sets of user data;

obtaining combined information of respective HARQ feedback information of the at least two sets of user data, the combined information comprising part or all of the respective HARQ feedback information of the at least two sets of user data; and sending the combined information on a time-frequency resource corresponding to the target resource location.

Optionally, the operation of determining the target resource location may include:

determining a resource location with a highest frequency or a lowest frequency from the second resource locations of the at least two sets of user data as the target resource location;

or, determining a second resource location of user data with an initial time-frequency location having an earliest or latest time domain in the at least two sets of user data as the target resource location;

or, determining a second resource location of user data with an initial time-frequency location having a highest or lowest frequency domain in the at least two sets of user data as the target resource location;

or, determining a second resource location of user data with highest service priority in the at least two sets of user data as the target resource location;

or, determining a second resource location of user data with a highest or lowest transmission physical layer parameter in the at least two sets of user data as the target resource location.

Optionally, the operation of obtaining the combined information of the respective HARQ feedback information of the at least two sets of user data may include:

obtaining HARQ feedback information of user data corresponding to the target resource location as the combined information;

or, combining the respective HARQ feedback information of the at least two sets of user data into the combined information;

or, combining the respective HARQ feedback information of the at least two sets of user data and a Non-Acknowledgement (NACK) corresponding to a same feedback resource location in time domain as the respective HARQ feedback information into the combined information in a frequency domain order, wherein the same feedback resource location in the time domain is other resource locations, which have an overlap with the respective second resource locations of the at least two sets of user data in the time domain, in the feedback resource pool.

An exemplary embodiment of the present disclosure provides an apparatus for transmitting feedback information between IOV devices, which may implement all or part of the operations executed by the first IOV device in the embodiments of the present disclosure shown in FIG. 2, FIG. 4 or FIG. 5. The apparatus for transmitting feedback information between IOV devices includes a processor and a memory configured to store an instruction executable by the processor.

The processor is configured to:

send at least one of first user data and scheduling control information of the first user data to a second IOV device;

determine a second resource location of the first user data based on a first resource location of the first user data, the first resource location indicating at least one of a time-frequency location of corresponding user data and a time-frequency location of scheduling control information of the corresponding user data; and receive HARQ feedback information of the first user data based on the second resource location of the first user data.

Optionally, the resource location determining module is specifically configured to determine the second resource location of the first user data from a feedback resource pool based on the first resource location of the first user data.

A time-frequency resource in the feedback resource pool may be configured to send the HARQ feedback information. Or, the HARQ feedback information may be sent through the time-frequency resource in the feedback resource pool. Or, the time-frequency resource in the feedback resource pool may be configured to send the HARQ feedback information, and the HARQ feedback information may be sent through the time-frequency resource in the feedback resource pool.

Optionally, the HARQ feedback information receiving module is specifically configured to:

receive the HARQ feedback information of the first user data on a time-frequency resource corresponding to the second resource location of the first user data;

or, receive the HARQ feedback information of the first user data on a time-frequency resource corresponding to the second resource location of the first user data and other resource locations which have an overlap with the second resource location of the first user data in time domain and are higher than the second resource location of the first user data in frequency domain in the feedback resource pool;

or, receive the HARQ feedback information of the first user data on a time-frequency resource corresponding to the second resource location of the first user data and other resource locations which have an overlap with the second resource location of the first user data in time domain and are lower than the second resource location of the first user data in frequency domain in the feedback resource pool.

The solutions provided in the embodiments of the present disclosure are introduced mainly with IOV devices as an example. It can be understood that, for realizing the above functions, the IOV devices each may include hardware structures and/or software modules corresponding to each function. In combination with the modules and algorithm operations described in the embodiments disclosed in the present disclosure, the embodiments of the present disclosure may be implemented by hardware or a combination of the hardware and computer software. Whether a function is executed by the hardware or in a manner of driving, through the computer software, the hardware depends on specific applications and design constraints of the technical solutions. Those skilled in the art may realize the described functions for each specific application by use of different methods, but such realization shall fall within the scope of the technical solutions of the embodiments of the present disclosure.

Figure 15:
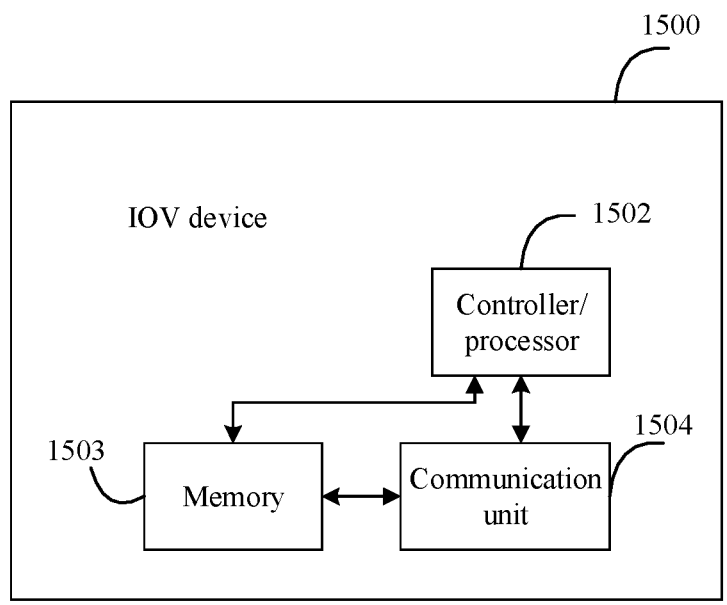
FIG. 15 is a structure diagram of an IOV device according to an exemplary embodiment.

FIG. 15 is a structure diagram of an IOV device according to an exemplary embodiment.

The IOV device 1500 includes a communication unit 1504 and a processor 1502. The processor 1502 may also be a controller, and is represented as "controller/processor 1502" in FIG. 15. The communication unit 1504 is configured to support the IOV device to communicate with another network entity (for example, other IOV devices).

Furthermore, the IOV device 1500 may further include a memory 1503, and the memory 1503 is configured to store a program code and data of the IOV device 1500.

It can be understood that FIG. 15 only shows a simplified design of the IOV device 1500. During a practical application, the IOV device 1500 may include any number of processors, controllers, memories, communication units and the like, and all IOV devices capable of implementing the embodiments of the present disclosure fall within the scope of protection of the embodiments of the present disclosure.

Those skilled in the art may realize that, in one or more above examples, the functions described in the embodiments of the present disclosure may be realized by hardware, software, firmware or any combination thereof. In case of implementation with the software, these functions are stored in a computer-readable medium or transmitted as one or more instructions or codes in the computer-readable medium. The computer-readable medium may include a computer storage medium and a communication medium. The communication medium may include any medium for conveniently transmitting a computer program from one place to another place. The storage medium may be any available medium accessible for a universal or dedicated computer.

An embodiment of the present disclosure also provides a computer storage medium, configured to store a computer software instruction for the first IOV device or the second IOV device, including a program designed to execute the method for transmitting feedback information between IOV devices.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for transmitting feedback information between Internet-of-Vehicles (IOV) devices, applicable to a second IOV device and comprising:

receiving at least one of first user data or scheduling control information of the first user data from a first IOV device;

determining a second resource location of the first user data based on a first resource location of the first user data, wherein the first resource location indicates at least one of a time-frequency location of the first user data or a time-frequency location of the scheduling control information of the first user data, the first user data is one of at least two sets of user data received by the second IOV device, and respective second resource locations of the at least two sets of user data have an overlap in time domain; and sending Hybrid Automatic Repeat Request (HARQ) feedback information of the first user data to the first IOV device based on the second resource location of the first user data, comprising:

determining a target resource location, the target resource location being one of the respective second resource locations of the at least two sets of user data;

obtaining combined information of respective HARQ feedback information of the at least two sets of user data, comprising:

combining the respective HARQ feedback information of the at least two sets of user data and a Non-Acknowledgement (NACK) corresponding to a same feedback resource location in time domain into the combined information in a frequency domain order, wherein the same feedback resource location in the time domain is other resource locations, which have an overlap with the respective second resource locations of the at least two sets of user data in the time domain, in a feedback resource pool; and sending the combined information on a time-frequency resource corresponding to the target resource location.

2. The method of claim 1, wherein the determining the second resource location of the first user data based on the first resource location of the first user data comprises:

determining the second resource location of the first user data from the feedback resource pool based on the first resource location of the first user data;

wherein a time-frequency resource in the feedback resource pool is configured to send the HARQ feedback information.

3. The method of claim 2, wherein the feedback resource pool comprises a plurality of time-frequency units;

sending the HARQ feedback information of the first user data to the first IOV device based on the second resource location of the first user data comprises:

determining a time-frequency unit corresponding to the second resource location of the first user data according to a preset mapping rule, wherein the preset mapping rule comprises mapping relationships between time-frequency resource locations in a data resource pool and the plurality of time-frequency units in the feedback resource pool, or, the preset mapping rule comprises mapping relationships between time-frequency resource locations in a scheduling control information resource pool and the plurality of time-frequency units in the feedback resource pool, wherein the data resource pool is a resource pool configured to transmit user data, and the scheduling control information resource pool is a resource pool configured to transmit scheduling control information of the user data; and sending the HARQ feedback information of the first user data to the first IOV device on the time-frequency unit corresponding to the second resource location of the first user data.

4. The method of claim 1, wherein the sending the HARQ feedback information of the first user data to the first IOV device based on the second resource location of the first user data comprises:

when the first user data is user data that needs to be transmitted repeatedly, sending the HARQ feedback information of the first user data based on the second resource location of the first user data in last repeated transmission; or, when the first user data is the user data that needs to be transmitted repeatedly, sending the HARQ feedback information of the first user data in present repeated transmission based on the second resource location of the first user data in each repeated transmission.

5. The method of claim 1, wherein the determining the target resource location comprises:

determining a resource location with a highest frequency or a lowest frequency from the second resource locations of the at least two sets of user data as the target resource location;

or, determining a second resource location of user data with an initial time-frequency location having an earliest or latest time domain in the at least two sets of user data as the target resource location;

or, determining a second resource location of user data with an initial time-frequency location having a highest or lowest frequency domain in the at least two sets of user data as the target resource location;

or, determining a second resource location of user data with highest service priority in the at least two sets of user data as the target resource location;

or, determining a second resource location of user data with a highest or lowest transmission physical layer parameter in the at least two sets of user data as the target resource location.

6. A method for transmitting feedback information between Internet-of-Vehicles (IOV) devices, applicable to a first IOV device and comprising:

sending at least one of first user data or scheduling control information of the first user data to a second IOV device;

determining a second resource location of the first user data based on a first resource location of the first user data, the first resource location indicating at least one of a time-frequency location of the first user data or a time-frequency location of the scheduling control information of the first user data, wherein the first user data is one of at least two sets of user data received by the second IOV device, and respective second resource locations of the at least two sets of user data have an overlap in time domain; and receiving Hybrid Automatic Repeat Request (HARQ) feedback information of the first user data based on the second resource location of the first user data, wherein the HARQ feedback information is combined information of respective HARQ feedback information of the at least two sets of user data, which is obtained by:

combining the respective HARQ feedback information of the at least two sets of user data and a Non-Acknowledgement (NACK) corresponding to a same feedback resource location in time domain into the combined information in a frequency domain order, wherein the same feedback resource location in the time domain is other resource locations, which have an overlap with the respective second resource locations of the at least two sets of user data in the time domain, in a feedback resource pool.

7. The method of claim 6, wherein the determining the second resource location of the first user data based on the first resource location of the first user data comprises:

determining the second resource location of the first user data from the feedback resource pool based on the first resource location of the first user data;

wherein a time-frequency resource in the feedback resource pool is configured to send the HARQ feedback information.

8. The method of claim 7, wherein the receiving the HARQ feedback information of the first user data based on the second resource location of the first user data comprises:

receiving the HARQ feedback information of the first user data on a time-frequency resource corresponding to the second resource location of the first user data; or, receiving the HARQ feedback information of the first user data on the time-frequency resource corresponding to the second resource location of the first user data and other resource locations which have an overlap with the second resource location of the first user data in time domain and are higher than the second resource location of the first user data in frequency domain in the feedback resource pool; or, receiving the HARQ feedback information of the first user data on the time-frequency resource corresponding to the second resource location of the first user data and other resource locations which have an overlap with the second resource location of the first user data in time domain and are lower than the second resource location of the first user data in frequency domain in the feedback resource pool.

9. An apparatus for transmitting feedback information between Internet-of-Vehicles (IOV) devices, applicable to a second IOV device and comprising:

a processor; and memory storing instructions executable by the processor; wherein the processor is configured to:

receive at least one of first user data or scheduling control information of the first user data from a first IOV device;

determine a second resource location of the first user data based on a first resource location of the first user data, the first resource location indicating at least one of a time-frequency location of the first user data or a time-frequency location of the scheduling control information of the first user data, wherein the first user data is one of at least two sets of user data received by the second IOV device, and respective second resource locations of the at least two sets of user data have an overlap in time domain; and send Hybrid Automatic Repeat Request (HARQ) feedback information of the first user data to the first IOV device based on the second resource location of the first user data, wherein the processor is further configured to:

determine a target resource location, the target resource location being one of the respective second resource locations of the at least two sets of user data;

obtain combined information of respective HARQ feedback information of the at least two sets of user data; and send the combined information on a time-frequency resource corresponding to the target resource location; and wherein the processor is further configured to:

combine the respective HARQ feedback information of the at least two sets of user data and a Non-Acknowledgement (NACK) corresponding to a same feedback resource location in time domain into the combined information in a frequency domain order, wherein the same feedback resource location in the time domain is other resource locations, which have an overlap with the respective second resource locations of the at least two sets of user data in the time domain, in a feedback resource pool.

10. The apparatus of claim 9, wherein the processor is further configured to determine the second resource location of the first user data from the feedback resource pool based on the first resource location of the first user data;

wherein a time-frequency resource in the feedback resource pool is configured to send the HARQ feedback information.

11. The apparatus of claim 10, wherein the feedback resource pool comprises a plurality of time-frequency units; and the processor is further configured to:

determine a time-frequency unit corresponding to the second resource location of the first user data according to a preset mapping rule, wherein the preset mapping rule comprises mapping relationships between time-frequency resource locations in a data resource pool and the plurality of time-frequency units in the feedback resource pool, or, the preset mapping rule comprises mapping relationships between time-frequency resource locations in a scheduling control information resource pool and the plurality of time-frequency units in the feedback resource pool, where the data resource pool is a resource pool configured to transmit user data, and the scheduling control information resource pool is a resource pool configured to transmit scheduling control information of the user data; and send the HARQ feedback information of the first user data to the first IOV device on the time-frequency unit corresponding to the second resource location of the first user data.

12. The apparatus of claim 9, wherein the processor is further configured to:

when the first user data is user data that needs to be transmitted repeatedly, send the HARQ feedback information of the first user data based on the second resource location of the first user data in last repeated transmission;

or, when the first user data is the user data that needs to be transmitted repeatedly, send the HARQ feedback information of the first user data in present repeated transmission based on the second resource location of the first user data in each repeated transmission.

13. The apparatus of claim 9, wherein the processor is further configured to:

determine a resource location with a highest or lowest frequency from the second resource locations of the at least two sets of user data as the target resource location;

or, determine a second resource location of user data with an initial time-frequency location having an earliest or latest time domain in the at least two sets of user data as the target resource location;

or, determine a second resource location of user data with an initial time-frequency location having a highest or lowest frequency domain in the at least two sets of user data as the target resource location;

or, determine a second resource location of user data with highest service priority in the at least two sets of user data as the target resource location;

or, determine a second resource location of user data with a highest or lowest transmission physical layer parameter in the at least two sets of user data as the target resource location.

14. An apparatus implementing the method of claim 6, comprising:

a processor; and memory storing instructions for execution by the processor to cause the processor to implement operations of the method.

15. The apparatus of claim 14, wherein the processor is further configured to determine the second resource location of the first user data from the feedback resource pool based on the first resource location of the first user data; and wherein a time-frequency resource in the feedback resource pool is configured to send the HARQ feedback information.

16. The apparatus of claim 15, wherein the processor is further configured to:

receive the HARQ feedback information of the first user data on a time-frequency resource corresponding to the second resource location of the first user data; or, receive the HARQ feedback information of the first user data on the time-frequency resource corresponding to the second resource location of the first user data and other resource locations which have an overlap with the second resource location of the first user data in time domain and are higher than the second resource location of the first user data in frequency domain in the feedback resource pool; or, receive the HARQ feedback information of the first user data on the time-frequency resource corresponding to the second resource location of the first user data and other resource locations which have an overlap with the second resource location of the first user data in time domain and are lower than the second resource location of the first user data in frequency domain in the feedback resource pool.

* * * * *